United States Patent
Zhang et al.

(10) Patent No.: US 12,380,164 B2
(45) Date of Patent: Aug. 5, 2025

(54) DATA STORAGE AND QUERYING

(71) Applicant: Alipay (Hangzhou) Information Technology Co., Ltd., Zhejiang (CN)

(72) Inventors: Songqing Zhang, Hangzhou (CN); Jin Jiang, Hangzhou (CN); Zhijun Fu, Hangzhou (CN); Bingpeng Zhu, Hangzhou (CN); Lin Yuan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/400,366

(22) Filed: Dec. 29, 2023

(65) Prior Publication Data
US 2024/0134911 A1  Apr. 25, 2024
US 2024/0232260 A9  Jul. 11, 2024

Related U.S. Application Data

(63) Continuation of application No. PCT/CN2022/123782, filed on Oct. 8, 2022.

(30) Foreign Application Priority Data

Oct. 8, 2021  (CN) .......................... 202111169465.6

(51) Int. Cl.
*G06F 16/901* (2019.01)
*G06F 16/903* (2019.01)

(52) U.S. Cl.
CPC .... *G06F 16/9024* (2019.01); *G06F 16/90335* (2019.01)

(58) Field of Classification Search
CPC .................. G06F 16/9024; G06F 16/90335
(Continued)

(56) References Cited

U.S. PATENT DOCUMENTS 9,330,138 B1  5/2016  Shankar et al.
10,380,188 B2 *  8/2019  Chen ................... G06F 16/9535
(Continued)

FOREIGN PATENT DOCUMENTS

CN  101645038  2/2010
CN  104123369  10/2014
(Continued)

OTHER PUBLICATIONS

Werth, Tobias, "Design and Implementation of a DAG-Miner", Friedrich-Alexander-Uinversität, Erlangen-Nürnberg, 2007, 111 pages.*
(Continued)

*Primary Examiner* — Robert Stevens
(74) *Attorney, Agent, or Firm* — Fish & Richardson P.C.

(57) ABSTRACT

Computer-implemented methods, apparatus, and systems for data storage and data query are described. During data storage, the number of neighboring graph nodes in each starting graph node in directed graph graph data to be stored is determined, and a data storage mode is determined according to the number of neighboring graph nodes. When the data storage mode is not an ultra-large node data storage, node data, neighbor information, outgoing edge index feature information, and outgoing edge data of the starting graph node are stored in the same data fragment. When the data storage mode is an ultra-large node data storage, node data, neighbor information, outgoing edge index feature range information, and outgoing edge data are stored in a starting graph node data fragment, and the outgoing edge data and outgoing edge data storage address information of the starting graph node are stored in at least two outgoing edge data fragments.

20 Claims, 12 Drawing Sheets

(58) Field of Classification Search
USPC .......................................................... 707/798
See application file for complete search history.

(56) References Cited

U.S. PATENT DOCUMENTS

| | | | | |
|---|---|---|---|---|
| 10,394,891 | B2* | 8/2019 | Chen | G06F 16/9024 |
| 10,599,656 | B1* | 3/2020 | Sharma | G06F 16/9535 |
| 11,500,935 | B2* | 11/2022 | Erler | G06F 16/9024 |
| 2015/0026158 | A1* | 1/2015 | Jin | G06F 16/90335 |
| | | | | 707/769 |
| 2015/0078377 | A1 | 3/2015 | Wijnands et al. | |
| 2016/0117358 | A1 | 4/2016 | Schmid et al. | |
| 2017/0286484 | A1* | 10/2017 | Fan | G06F 16/90335 |
| 2018/0324040 | A1 | 11/2018 | Patterson et al. | |
| 2018/0329958 | A1* | 11/2018 | Choudhury | G06F 16/2456 |
| 2020/0226156 | A1 | 7/2020 | Borra et al. | |
| 2020/0401625 | A1* | 12/2020 | Wright | G06F 16/90335 |
| 2021/0004374 | A1* | 1/2021 | Xia | G06F 9/4881 |
| 2022/0335068 | A1* | 10/2022 | Yue | G06F 16/285 |

FOREIGN PATENT DOCUMENTS

| | | |
|---|---|---|
| CN | 106227794 | 12/2016 |
| CN | 106919628 | 7/2017 |
| CN | 108920105 | 11/2018 |
| CN | 110737659 | 1/2020 |
| CN | 111190904 | 5/2020 |
| CN | 112287182 | 1/2021 |
| CN | 112363979 | 2/2021 |
| CN | 113609347 | 11/2021 |
| CN | 114077680 | 2/2022 |
| CN | 114186100 | 3/2022 |
| CN | 115203489 | 10/2022 |
| CN | 117290560 | 12/2023 |
| CN | 117932120 | 4/2024 |
| WO | WO 2019/241021 A9 * | 12/2019 .......... G06F 19/901 |
| WO | WO 2021/083239 | 5/2021 |
| WO | WO 2023/098316 | 6/2023 |
| WO | WO 2023/131218 | 7/2023 |

OTHER PUBLICATIONS

Hocine, Imane, et al., "Reachability in big graphs: A distributed indexing and querying approach", Information Sciences, vol. 573, Sep. 2021, pp. 541-561.*

Wang, Haixun, et al., "ViST: A Dynamic Index Method for Querying XML Data by Tree Structures", SIGMOD 2003, San Diego, CA, Jun. 9-12, 2003, pp. 110-121.*

Kaushik, Raghav, et al., "Exploiting Local Similarity for Indexing Paths in Graph-Structured Data", ICDE '02, San Jose, CA, Feb. 26-Mar. 1, 2002, 12 pages.*

Yan, Xifeng, et al., "Graph Indexing Based on Discriminative Frequent Structure Analysis", ACM Transactions on Database Systems, vol. 30, No. 4, Dec. 2005, pp. 960-993.*

International Search Report and Written Opinion in International Appln. No. PCT/CN2022/123782, mailed on Apr. 18, 2024, 14 pages (with English translation).

International Search Report and Written Opinion in International Appln. No. PCT/CN2022/123782, mailed on Jan. 3, 2023, 17 pages (with English translation).

* cited by examiner

DATA STORAGE AND QUERYING

CROSS-REFERENCE TO RELATED APPLICATIONS

This application is a continuation of PCT Application No. PCT/CN2022/123782, filed on Oct. 8, 2022, which claims priority to Chinese Patent Application No. 202111169465.6, filed on Oct. 8, 2021, and each application is hereby incorporated by reference in its entirety.

TECHNICAL FIELD

The embodiments of the present specification generally involve the field of data processing, particularly involve data storage methods and devices for graph data, data query methods and devices, and database systems.

BACKGROUND

The application scenarios of graph data are increasingly widespread, and the amount of graph data is also increasing. The memory storage method is limited by the memory capacity and price, and the data storage scale is limited, so it is not suitable for storing massive graph data, and the graph data need to be stored in a data storage medium such as a disk. The existing graph data storage schemes cannot store graph data in a data storage medium with a higher data query efficiency.

SUMMARY

Given the above, the embodiments of the present specification provide data storage and query methods. By using the data storage and query method, graph data can be stored in a data storage medium in a node-edge mixed storage manner, and data query can be implemented efficiently.

According to an aspect of the embodiments of the present specification, a data storage method is provided, including: determining a number of neighboring graph nodes of each starting graph node in directed graph graph data to be stored; determining a data storage mode based on the number of neighboring graph nodes of each starting graph node; for each starting graph node, when the data storage mode is non-ultra-large node data storage, storing node data, neighbor information, outgoing edge index feature information, and outgoing edge data of the starting graph node in a first starting graph node data fragment of a first data storage media, wherein the outgoing edge index feature information includes outgoing edge index features of all outgoing edges of the starting graph node, and each outgoing edge index feature has a mapping relationship with an outgoing edge data index that is used for indexing a corresponding outgoing edge data stored in the first starting graph node data fragment; and for each starting graph node, when the data storage mode is ultra-large node data storage, storing node data, neighbor information, outgoing edge index feature range information, and outgoing edge data fragment index information of the starting graph node in a second starting graph node data fragment of a second data storage medium, wherein the outgoing edge index feature range information includes multiple outgoing edge index feature ranges that are mapped to outgoing edge data fragment index information, and storing outgoing edge data and storage address information of the outgoing edge data in at least two outgoing edge data fragments of a third data storage medium, wherein the storage address information of the outgoing edge data includes a two-dimensional array <an outgoing edge index feature of the outgoing edge data, a relative storage address of the outgoing edge data in the outgoing edge data fragment>.

In an example in the above aspect, the data storage manner is determined based on all starting graph nodes in the directed graph graph data, or the data storage manner is determined based on each starting graph node in the directed graph graph data.

In one example of the above aspects, the node data include a node identifier of the starting graph node and node attributes, the neighbor information includes a node identifier of the starting graph node and neighbor attributes, the neighbor attributes include basic information of all outgoing edges, and the outgoing edge data include an outgoing edge identifier and outgoing edge attributes.

In an example of the above aspects, each outgoing edge basic information includes a node identifier of a terminal graph node of the outgoing edge and an outgoing edge index feature of the outgoing edge, and the outgoing edge identifier includes a node identifier of the terminal graph node and an outgoing edge index feature.

In an example of the above aspects, the basic information of each outgoing edge further includes a node type of a terminal graph node of the outgoing edge and/or an outgoing edge type of the outgoing edge, and the outgoing edge identifier further includes an outgoing edge type.

In one example in the above aspects, the node data further include node meta-data, the node meta-data including a node index feature of the starting graph node and/or a node type.

In an example aspect, the index feature comprises a timestamp, the outgoing edge index feature information comprises outgoing edge timestamps of all outgoing edges after being sorted in descending order, and the outgoing edge index feature range information comprises multiple outgoing edge timestamp ranges after being sorted in descending order.

In one example of the above aspects, each outgoing edge timestamp range is stored with the maximum outgoing edge timestamp and the minimum outgoing edge timestamp corresponding to the outgoing edge data fragment.

In one example of the above aspects, the first starting graph node data fragment and the second starting graph node data fragment also store reverse neighbor information, and/or the outgoing edge data fragment also stores an outgoing edge count.

In an example in the above aspect, when the number of neighbors of each starting graph node exceeds a preset threshold, and the data storage mode is determined to be an ultra-large node data storage mode, the storing the node data, the neighbor information, outgoing edge index feature range information, and outgoing edge data fragment index of the starting graph node in a second starting graph node data fragment in a second data storage medium may include: storing node data, neighbor index feature range information, neighbor data fragment index information, and outgoing edge index feature range information and outgoing edge data fragment index information of the starting graph node in the second starting graph node data fragment of the second data storage medium; and storing neighbor information in at least two neighbor data fragments of the fourth data storage medium, wherein the neighbor index feature range includes multiple neighbor index feature ranges forming a mapping relationship with the neighbor data fragment index.

In an example of the above aspects, the first data storage medium, the second data storage medium, and the third data storage medium respectively include one or more data storage media, and some of the data storage media of the first data storage medium, the second data storage medium, and the third data storage medium are implemented using the same data storage medium.

In an example in the above aspects, the non-ultra-large node data storage and the ultra-large node data storage are implemented by using a key-value pair storage mode.

According to an aspect of the embodiments of the present specification, a data query method is provided, including: in response to receiving a data query request initiated by a user, determining a data fragment index of a query target graph node based on a node identifier of the query target graph node, and first, second, and/or third data storage media storing the directed graph graph data in the method described above; reading a starting graph node data fragment indexed by the data fragment index from the first data storage medium or the second data storage medium and parsing the starting graph node data fragment into the memory of the data query apparatus; acquiring query data of the data query request from the local parsed data of the data query apparatus or from an outgoing edge data fragment of the third data storage medium according to a parsed data fragment of the starting graph node; and providing the acquired query data to the user.

In an example aspect, the node data include a node identifier of the starting graph node and node attributes, the neighbor information includes a node identifier of the starting graph node and neighbor attributes, the neighbor attributes include basic information of all outgoing edges, and the outgoing edge data includes an outgoing edge identifier and outgoing edge attributes. In this case, the acquiring query data of the query request from the local query data parsed by the data query device or from an outgoing edge data fragment of a third data storage medium according to a parsed starting graph node data fragment can include: in response to the query request indicating that query a node attribute of the graph node, acquiring node attributes in the node data parsed out from the starting graph node data fragments as the query data; in response to the query request indicating that query a neighbor attribute of the graph node, acquiring neighbor attributes in the neighbor information parsed out as the query data; or in response to the query request indicating that query an outgoing edge attribute of the graph node, determining an outgoing edge index feature of a target outgoing edge based on the neighbor information parsed out from the starting graph node data fragments, determining an index of the outgoing edge data of the target outgoing edge based on the outgoing edge index feature and the outgoing edge index feature information, and acquiring the outgoing edge attribute of the target outgoing edge from the outgoing edge data indexed by the outgoing edge data index as the query data; or determining an outgoing edge data fragment index of the target outgoing edge based on the outgoing edge index feature and the outgoing edge index feature range information, and acquiring the outgoing edge attribute of the target outgoing edge as the query data from an outgoing edge data fragment in the third data storage medium that is indexed by the outgoing edge data fragment index.

In an example in the above aspect, the data query request comprises a filtering condition. In this case, obtaining the node attribute in the node data of the parsed starting graph node data fragment in response to the data query request indicating querying node attributes of the graph node can include: in response to the data query request indicating querying node attributes of the graph node, query filtering the node data of the parsed starting graph node data fragment based on the filtering condition in the data query request, and obtaining node attributes of the node data after querying and filtering. Obtaining the node attribute in the neighbor information in response to the data query request indicating querying neighbor attributes of the graph node can include: in response to the data query request indicating querying neighbor attributes of the graph node, query filtering the neighbor information based on the filtering condition in the data query request, and obtaining neighbor attributes in the neighbor information after querying and filtering. In response to the data query request indicating querying outgoing edge attributes of the graph node, determining the outgoing edge index feature of the target outgoing edge from the neighbor information of the parsed starting graph node data fragment can include: in response to the data query request indicating querying outgoing edge attributes of the graph node, determining the outgoing edge index feature of the target outgoing edge meeting the filtering condition from the neighbor information of the parsed starting graph node data fragment.

In an example of the above aspect, obtaining the outgoing edge attribute of the target outgoing edge from the outgoing edge data fragment of the third data storage medium indexed by the outgoing edge data fragment index as the query data can include: reading the outgoing edge data fragment indexed by the outgoing edge data fragment index from the third data storage medium to a memory of the data query device; parsing the outgoing edge data storage address information in the read outgoing edge data fragment; based on the outgoing edge index feature of the target outgoing edge, determining the relative storage address of the outgoing edge data of the target outgoing edge in the outgoing edge data fragment from the parsed outgoing edge data storage address information; obtaining the outgoing edge data of the target outgoing edge from the read outgoing edge data fragment based on the relative storage address and parsing the outgoing edge data; and obtaining the outgoing edge attribute in the parsed outgoing edge data of the target outgoing edge, as the query data.

In an example in the above aspects, the outgoing edge index feature includes an outgoing edge timestamp. Correspondingly, based on the outgoing edge index feature and the outgoing edge index feature information, determining the outgoing edge data index of the target outgoing edge can include: based on the outgoing edge timestamp, using a binary search method to determine the outgoing edge data index of the target outgoing edge in the outgoing edge timestamp information by searching in the outgoing edge timestamp information. Alternatively, based on the outgoing edge index feature and the outgoing edge index feature range information, determining the outgoing edge data fragment index of the target outgoing edge can include: based on the outgoing edge timestamp, using a binary search method to determine the outgoing edge data fragment index of the target outgoing edge in the outgoing edge time stamp range information by searching in the outgoing edge timestamp range information.

In one aspect, when the data storage mode is the ultra-large node data storage, for each starting graph node whose number of neighbors exceeds a predetermined threshold, the second starting graph node data fragment stores the node data, neighbor index feature ranges, neighbor data fragment index, outgoing edge index feature range information, and outgoing edge data fragment index of the starting graph node, and the neighbor information of the starting graph node is respectively stored in at least two neighbor data fragments of a fourth data storage medium. Correspondingly, before the obtaining the neighbor attribute in parsed neighbor information, the data query method can further include: in response to the data query request indicating to query the neighbor attributes of the graph node, determining a neighbor data fragment index based on the neighbor index feature and the index feature range information of the neighbors; and reading a neighbor data fragment indexed by the neighbor data fragment index from the fourth data storage medium into the memory of the data query apparatus and parsing the neighbor data fragment.

In another aspect of the embodiment of the present specification, a data storage apparatus is provided, including: a node number determining unit, determining a number of neighboring graph nodes of each starting graph node in the directed graph graph data to be stored; a data storage mode determining unit, determining a data storage mode according to the number of neighboring graph nodes of each starting graph node; and a data storage unit, for each starting graph node, when the data storage mode is non-ultra-large node data storage, storing node data, neighbor information, outgoing edge index feature information, and outgoing edge data of the starting graph node in a first starting graph node data fragment in the first data storage medium, the outgoing edge index feature information including outgoing edge index feature of all outgoing edges of the starting graph node, each outgoing edge index feature has a mapping relationship with an outgoing edge data index that is used for indexing corresponding outgoing edge data stored in the first starting graph node data fragment; and when the data storage mode is ultra-large node data storage, storing node data, neighbor information, outgoing edge index feature range information, and outgoing edge data fragment index of the starting graph node in a second starting graph node data fragment in the second data storage medium, the outgoing edge index feature range information including multiple outgoing edge index feature ranges having a mapping relationship with the outgoing edge data fragment index, and storing outgoing edge data and outgoing edge data storage address information of the starting graph node in at least two outgoing edge data fragments in the third data storage medium, the outgoing edge data storage address information including a binary array <outgoing edge index feature of outgoing edge data, relative storage address of outgoing edge data in the outgoing edge data fragment>.

In one example of the above aspects, the data storage mode determining unit determines the data storage mode by determining the data storage mode relative to all starting graph nodes in the directed graph graph data, or by determining the data storage mode relative to each starting graph node in the directed graph graph data.

In one example of the above aspects, for each starting graph node whose number of neighbors exceeds a predetermined threshold, when the data storage mode is ultra-large node data storage, the data storage unit stores the node data, the neighbor index feature range, the neighbor data fragment index, the outgoing edge index feature range information, and the outgoing edge data fragment index of the starting graph node in the second starting graph node data fragment in the second data storage medium, stores the neighbor information in at least two neighbor data fragments in the fourth data storage medium, and stores the outgoing edge data and the outgoing edge data storage address information of the starting graph node in at least two outgoing edge data fragments in the third data storage medium.

According to another aspect of the embodiments of the present specification, a data query apparatus includes: a data fragment index determining unit, configured to, in response to receiving a data query request initiated by a user, determine a data fragment index of a target query graph node based on a node identifier of the target query graph node, and store the directed graph graph data according to the above-mentioned method in a first data storage medium, a second data storage medium, and/or a third data storage medium; a data reading unit, configured to read an starting graph node data fragment indexed by the data fragment index from the first data storage medium or the second data storage medium into a memory of the data query apparatus; a data parsing unit, configured to parse the read starting graph node data fragment; a query data acquisition unit, configured to acquire query data of the data query request according to the parsed starting graph node data fragment in a local parsed data of the data query apparatus or from an outgoing edge data fragment of the third data storage medium; and a query data providing unit, configured to provide the acquired query data to the user.

In one aspect, the node data include a node identifier of a starting graph node and node attributes, the neighbor information includes a node identifier of the starting graph node and neighbor attributes, the neighbor attributes include basic information of all outgoing edges, and the outgoing edge data includes an outgoing edge identifier and outgoing edge attributes. In response to the data query request indicating that the query is to be performed on node attributes of a graph node, the query data acquisition unit acquires node attributes of the node data of the parsed starting graph node data fragments as the query data. In response to the data query request indicating that the query is to be performed on neighbor attributes of a graph node, the query data acquisition unit acquires neighbor attributes of the neighbor information of the parsed neighbor information as the query data. In response to the data query request indicating that the query is to be performed on outgoing edge attributes of a graph node, the query data acquisition unit determines an outgoing edge index feature of a target outgoing edge from the neighbor information of the parsed starting graph node data fragments, determines an index of outgoing edge data of the target outgoing edge based on the outgoing edge index feature and the outgoing edge index feature information, and acquires outgoing edge attributes of the target outgoing edge from outgoing edge data of the parsed starting graph node data fragments indexed by the outgoing edge data index as the query data, or determines an index of an outgoing edge data fragment of the target outgoing edge based on the outgoing edge index feature and outgoing edge index feature range information, and acquires outgoing edge attributes of the target outgoing edge from an outgoing edge data fragment of the third data storage medium indexed by the outgoing edge data fragment index as the query data.

In an example in the above aspects, the data query request includes a filtering condition. The query data acquisition unit further performs query filtering on the node data of the parsed starting graph node data fragment based on the filtering condition in the data query request in response to the data query request indicates querying an attribute of a node of a graph node. The query data acquisition unit further performs query filtering on the parsed neighbor information based on the filtering condition in the data query request in response to the data query request indicates querying an attribute of a node of a graph node. The query data acquisition unit further determines an outgoing edge index feature of a target outgoing edge meeting the filtering condition from the parsed neighbor information of the starting graph node data fragment parsed from the graph node in response to the data query request indicates querying an attribute of an outgoing edge of a graph node.

In one example in the above aspect, the data reading unit reads the edge data fragments indexed by the outgoing edge data fragment index from the third data storage medium and stores the edge data fragments in the memory of the data query device. The data parsing unit parses the outgoing edge data storage address information in the edge data fragments, according to the outgoing edge index feature of the target outgoing edge. The data query unit is configured to determine a relative storage address of the target outgoing edge in the edge data fragments from the parsed outgoing edge data storage address information; acquire the outgoing edge data of the target outgoing edge from the outgoing edge data fragments read based on the relative storage address and parse the outgoing edge data; and obtain the outgoing edge attributes of the parsed outgoing edge data of the target outgoing edge as the query data.

In an example of the above aspect, when the data storage mode is ultra-large node data storage and the number of neighbors of each starting graph node exceeds a predetermined threshold, the second starting graph node data fragment stores the node data, neighbor index feature range, neighbor data fragment index, outgoing edge index feature range information, and outgoing edge data fragment index of the starting graph node, and the neighbor information of the starting graph node is respectively stored in at least two neighbor data fragments of a fourth data storage medium. In response to the data query request indicates to query the neighbor attribute of the query graph node, the query data acquisition unit determines the neighbor data fragment index based on the neighbor index feature and the neighbor index feature range information, and the data reading unit reads the neighbor data fragment indexed by the neighbor data fragment index from the fourth data storage medium to the memory of the data query apparatus. The data parsing unit further parses the read neighbor data fragment.

In another embodiment of the present specification, a database system is provided, including: data storage devices as described above; data query devices as described above; and data storage medium including a first data storage medium, a second data storage medium, and/or a third data storage medium.

In another embodiment of the present disclosure, a data storage apparatus is provided, including: at least one processor, a storage device coupled to the at least one processor, and a computer program stored in the storage device, the at least one processor executing the computer program to implement the data storage methods described above.

In another aspect of the embodiments of the present specification, a data query apparatus is provided, including: at least one processor, and a memory coupled to the at least one processor, and computer program stored in the memory, wherein the at least one processor executes the computer program to implement the data query methods described above.

In another aspect of the embodiments of the present specification, a computer-readable storage medium is provided, storing executable instructions, the instructions when executed causing the processor to perform the data storage methods as described above or to perform the data query methods as described above.

According to another aspect of the embodiments of the present disclosure, a computer program product is provided, including a computer program, the computer program being executed by a processor to implement the data storage method as described above, or to implement the data query method as described above.

BRIEF DESCRIPTION OF THE DRAWINGS

The substance and advantages of the content of the specification may be further understood by referring to the following figures, in which similar components or features may have the same figure labels.

DESCRIPTION OF EMBODIMENTS

Figure 1:
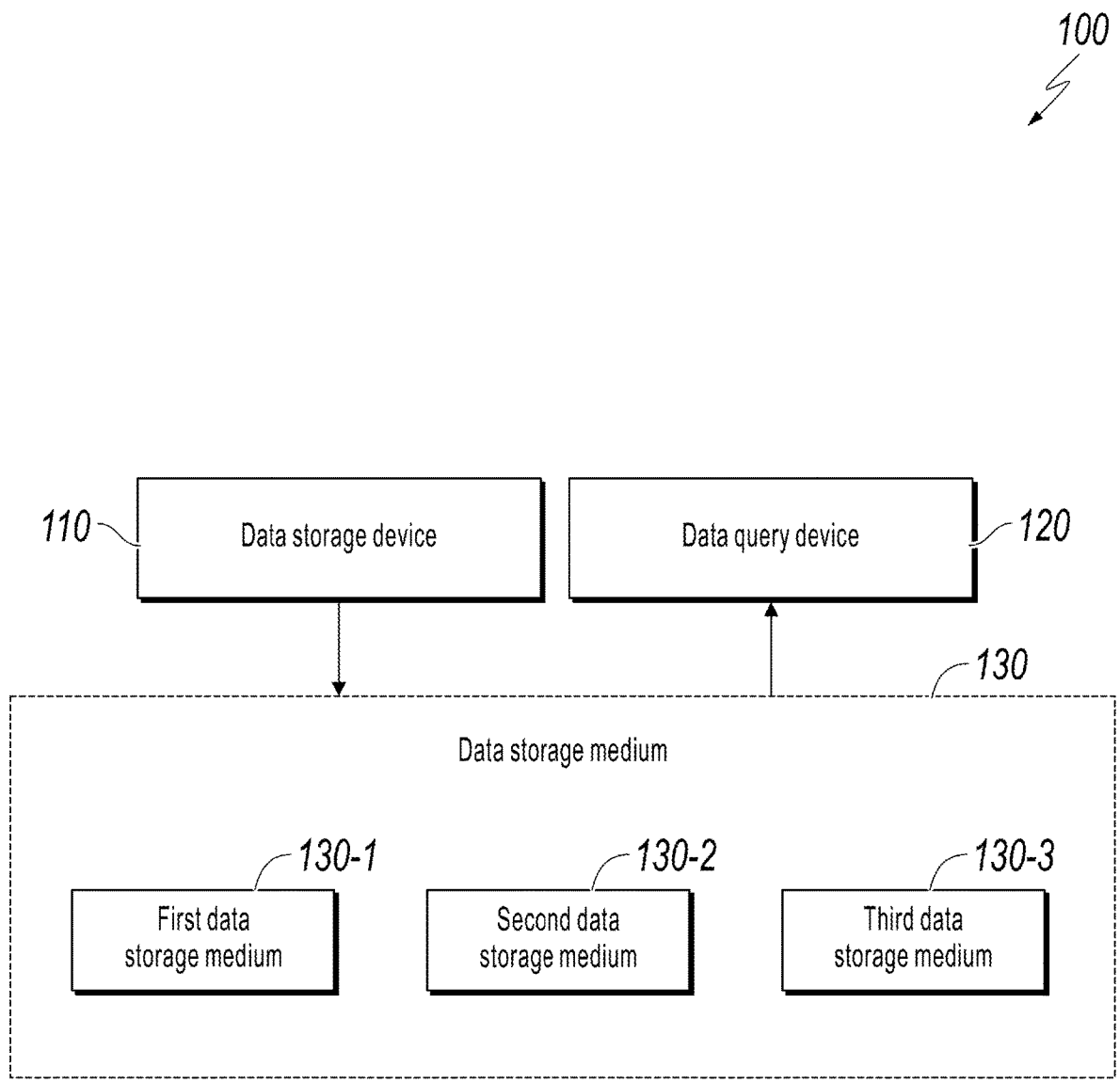
FIG. 1 illustrates an exemplary diagram of a database system according to an embodiment of the present disclosure.

The following will discuss the subject matter described in this document by referring to the exemplary embodiments. It should be understood that the discussion of the exemplary embodiments is for the purpose of enabling those skilled in the art to better understand the subject matter described in this document, and is not a limitation on the scope of protection, the applicability, or the examples described in the claims. The function and arrangement of the elements discussed can be changed without deviating from the scope of protection of this document. Various processes or components can be omitted, substituted, or added in the exemplary embodiments. For example, the method described can be performed in an order different from the order described, and various steps can be added, omitted, or combined. In addition, features described in some exemplary embodiments can also be combined in other examples.

As used in this document, the term "including" and its variants indicate an open term, meaning "including but not limited to". The term "based on" indicates "at least partially based on". The term "an embodiment" and "an example" indicate "at least one embodiment". The term "another embodiment" indicates "at least one other embodiment". The term "first", "second", etc. can refer to different or the same objects. Other definitions can be included below, either explicitly or implicitly. Unless explicitly indicated in the context, the definition of a term is consistent throughout the specification.

The graph data include graph node data and edge data. The graph node data may, for example, include a node identifier (node ID) and node attribute of the graph node, and the edge data may include edge attribute data. The node identifier of the graph node is used to uniquely identify the node. The node identifier, node attribute data, and edge attribute data may be related to a business. For example, in a social network scenario, the node identifier may be an identity card number or personnel number of a person. The node attribute data may include age, education, address, profession, and the like. The edge attribute data may include a relationship between nodes, that is, a relationship between persons, such as a classmate or colleague relationship, and the like. In a case of massive graph data, there are massive graph node data and edge data, and complex association relationships exist between the graph node data and edge data. A graph data storage method in a data storage medium may greatly affect a graph data query efficiency.

In some graph data storage schemes, edge data are stored separately. According to this graph data storage scheme, multiple outgoing edge data of a starting node may be stored in different data fragments (edge tables). During edge information querying (e.g., querying outgoing edge attributes), multiple I/O querying (I/O reading) operations may be needed. Here, I/O querying refers to data interaction with a data storage medium (e.g., a disk) through an I/O interface of an operating system of a data querying device, and then reading I/O querying results (I/O query data) from the data storage medium into a memory of the data querying device. I/O querying may become a system bottleneck of the data querying device, thus increasing query delays and leading to poor efficiency in querying graph data. Further, in this graph data storage scheme, when a number of neighbors of a graph node is ultra-large, it is needed to traverse all outgoing edges of the graph node to query outgoing edge information of the specified timestamp of the graph node, thus leading to more unnecessary data querying and data parsing, and low data querying efficiency.

In some graph data storage schemes, the node data of the graph nodes, the edge data and the neighbor information are stored in node tables, edge tables and neighbor tables with different data structures, and are respectively deployed on independent node table servers, edge table servers and neighbor table servers. Because the storage data on different servers are heterogeneous, the update of the neighbor table becomes the system bottleneck of the database system in the case of frequent update of the graph topology structure.

Database systems, data storage methods, data storage apparatuses, data query methods, and data query apparatuses according to embodiments of the present specification will be described below with reference to the accompanying drawings.

FIG. 1 is an exemplary diagram of a database system 100 according to an embodiment of the present disclosure. The database system 100 may also be referred to as a database application server, and is used to provide data storage services and data query services.

As shown in FIG. 1, database system 100 includes data storage device 110, data query device 120, and at least one data storage medium 130. In the example of FIG. 1, at least one data storage medium 130 includes first data storage medium 130-1, second data storage medium 130-2, and/or third data storage medium 130-3. It should be noted that first data storage medium 130-1, second data storage medium 130-2, and third data storage medium 130-3, although being shown as one data storage medium, in other implementations, each of first data storage medium 130-1, second data storage medium 130-2, and third data storage medium 130-3 can have multiple data storage media.

The data storage device 110 is configured to store the data to be stored to the data storage medium 130 of the database system 100. The data query device 120 is configured to obtain the target data (query data) from the data storage medium 130 in response to a data query request.

The data storage medium 130 can also be referred to as an external memory. When the data query device 120 performs data querying, data stored in the data storage medium 130 need to be read into the memory of the data query device 120 by means of an operation such as an IO query for data reading, and data querying processing needs to be performed on the data in the memory to obtain query data. The data storage medium 130 can be various non-volatile storage mediums, such as a disk device and a storage card. A disk refers to a storage device that stores data using a magnetic recording technology. Examples of disks can include various forms of floppy disks (Soft Disk) and hard disks.

Figure 2:
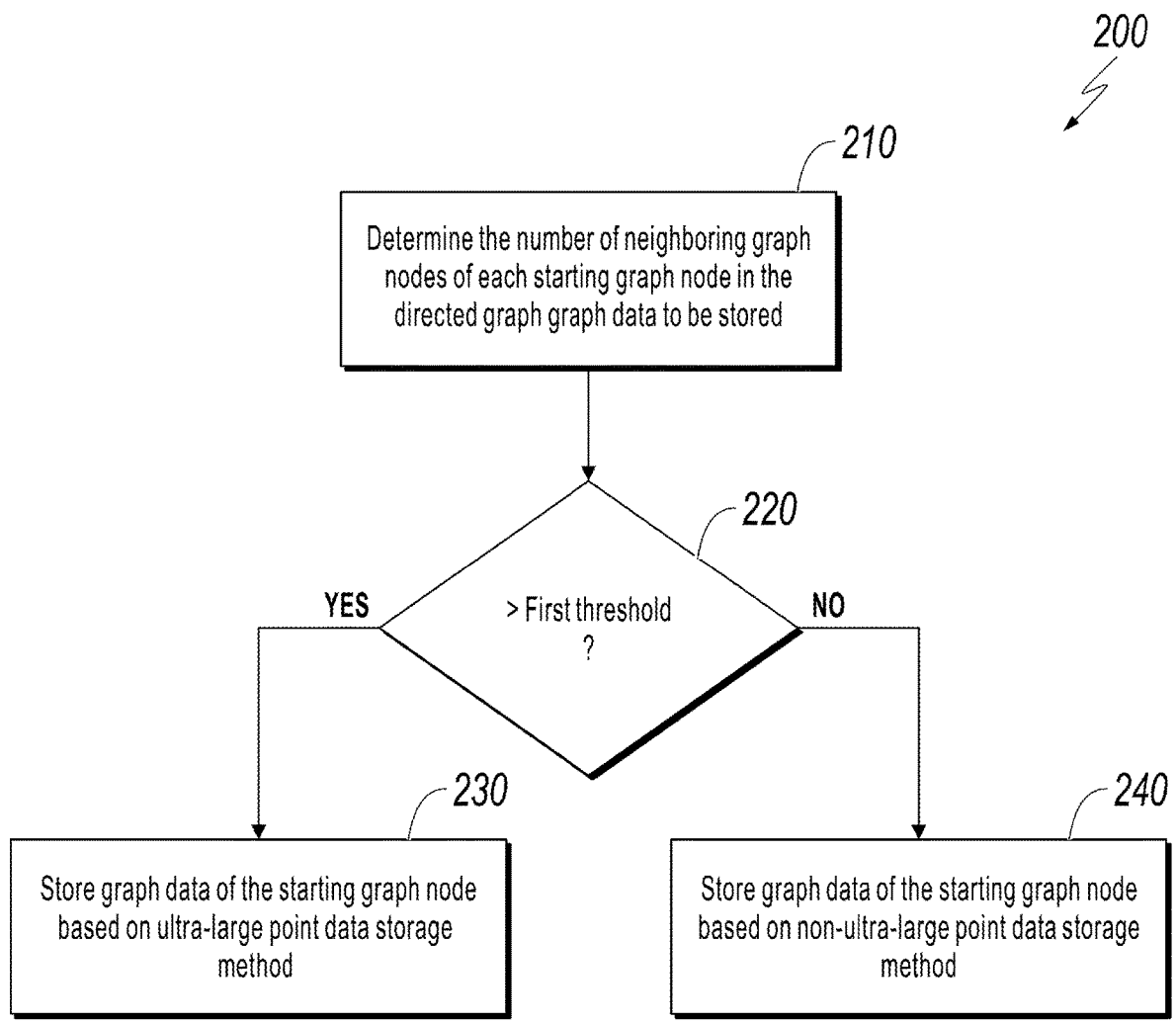
FIG. 2 is an example flow chart illustrating a data storage method according to an embodiment of the present disclosure.

FIG. 2 is an exemplary flowchart of a data storage method 200 according to an embodiment of the present disclosure.

Figure 3:
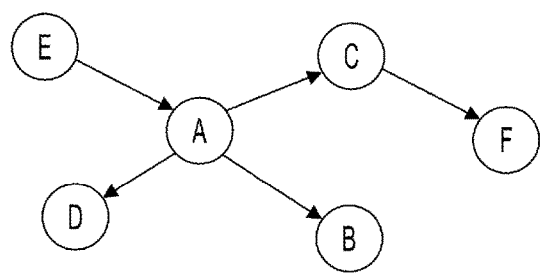
FIG. 3 is a diagram showing an example of directed graph graph data.

As shown in FIG. 2, in 210, determine the number of neighboring graph nodes of each starting graph node in the directed graph graph data to be stored. The term "directed graph" refers to graph data in which edge relationships between graph nodes have directionality. In the present specification, the term "neighboring graph node" refers to a graph node that can be reached by one hop along an edge. An example of a directed graph graph data is shown in FIG. 3. In the example of FIG. 3, six graph nodes A, B, C, D, E, and F are shown. Graph nodes B, C, and D are neighbor nodes of graph node A, and graph node F is a neighbor node of graph node C. Graph node E is not a neighbor node of graph node A, but is a reverse neighbor node of graph node A.

After determining the number of neighboring graph nodes of each starting graph node, a data storage manner is determined in 220 according to the number of neighboring graph nodes of each starting graph node.

In an example, a data storage mode of the directed graph graph data can be determined relative to all starting graph nodes in the directed graph graph data. In this example, data storage modes of all graph nodes in the directed graph graph data are the same. In this way, after the number of neighboring graph nodes of all starting graph nodes in the directed graph graph data is determined, the maximum value of the number of neighboring graph nodes is compared with a first threshold. If the maximum value is greater than the first threshold, the data storage mode is determined as an ultra-large node data storage. If the maximum value is not greater than the first threshold, the data storage mode is determined as a non-ultra-large node data storage. Here, the first threshold can be set based on a storage capacity of a data storage medium used, or can be set based on an application scenario or experience.

In another example, a data storage mode of each starting graph node may be determined, respectively, based on each starting graph node in the directed graph graph data. In this example, a data storage mode of each graph node in the directed graph graph data is determined based on a respective number of neighbor nodes, so that a data storage mode of each starting graph node may be the same or different. In this way, after a number of neighbor nodes of a starting graph node is determined, a data storage mode of the starting graph node may be determined based on the number of neighbor nodes of the starting graph node, and then a subsequent data storage operation may be performed, without the need to wait for a number of neighbor nodes and a data storage mode of other starting graph nodes to be determined.

After the data storage mode of the starting graph node is determined as above, the graph data storage of the corresponding starting graph node is completed according to the determined data storage mode.

Specifically, in 230, for each starting graph node, when the determined data storage mode is a non-ultra-large node data storage, the node data, neighbor information, outgoing edge index feature information, and outgoing edge data of the starting graph node are stored in the first starting graph node data fragment of the first data storage medium 130-1. In this specification, the term "index feature" can refer to a specific graph data feature that helps generate or determine index information during data storage and/or graph data query. For example, when data storage is performed, a mapping relationship can be formed between an outgoing edge index feature of each outgoing edge and an outgoing edge index that is used for indexing corresponding outgoing edge data stored in a data fragment. In one example, the outgoing edge index feature of each outgoing edge can be stored in the outgoing edge index feature information, and the corresponding outgoing edge data are stored sequentially in the data fragment according to the storage order (or storage position) of the outgoing edge index feature of the outgoing edge in the outgoing edge index feature information. This allows each storage location in the outgoing edge index feature information to serve as an outgoing edge index of the corresponding outgoing edge data. A mapping relationship is formed between the outgoing edge index feature and the storage location in the outgoing edge index feature information (i.e., outgoing edge data index). During data query, the corresponding data index can be obtained based on the data index feature, thereby realizing data query. For example, a timestamp, a specific attribute of data, and the like can be an example of an index feature of data. Here, a specific attribute of data can include an attribute that helps determine a data storage index. For example, when a data attribute includes "age of the payee", when data storage is performed, data can be stored sequentially according to the age of the payee, thereby generating an index of a data storage location based on the attribute "age of the payee", and the attribute "age of the payee" can serve as an index feature. The outgoing edge index feature information includes all outgoing edge index features of the starting graph node, and each outgoing edge index feature has a mapping relationship with an outgoing edge data index that is used for indexing corresponding outgoing edge data stored in the first starting graph node data fragment. For example, the outgoing edge index feature of each outgoing edge can be recommended to be mapped to the outgoing edge index feature in the outgoing edge index feature information according to the storage order of the outgoing edge index feature in the outgoing edge index feature information, and the storage order of the outgoing edge index feature in the outgoing edge index feature information can be used to index a corresponding outgoing edge data in the index of a first starting graph node data fragment. For example, assume that there are 4 outgoing edge data A1, A2, A3, and A4, and the outgoing edge index feature values of the o outgoing edge data A1, A2, A3, and A4 are F1, F2, F3, and F4, respectively. During data storage, the feature values F1, F2, F3 and F4 can be stored in the outgoing edge index feature information. If the storage order of the feature values in the outgoing edge index feature information is F1, F3, F2 and F4, the storage order of the outgoing edge data A1, A2, A3 and A4 in the data segment is A1, A3, A2 and A4.

In one example, each first data storage medium can store a first starting graph node data fragment. In another example, the first data storage medium can also store more than one first starting graph node data fragment.

Figure 4:
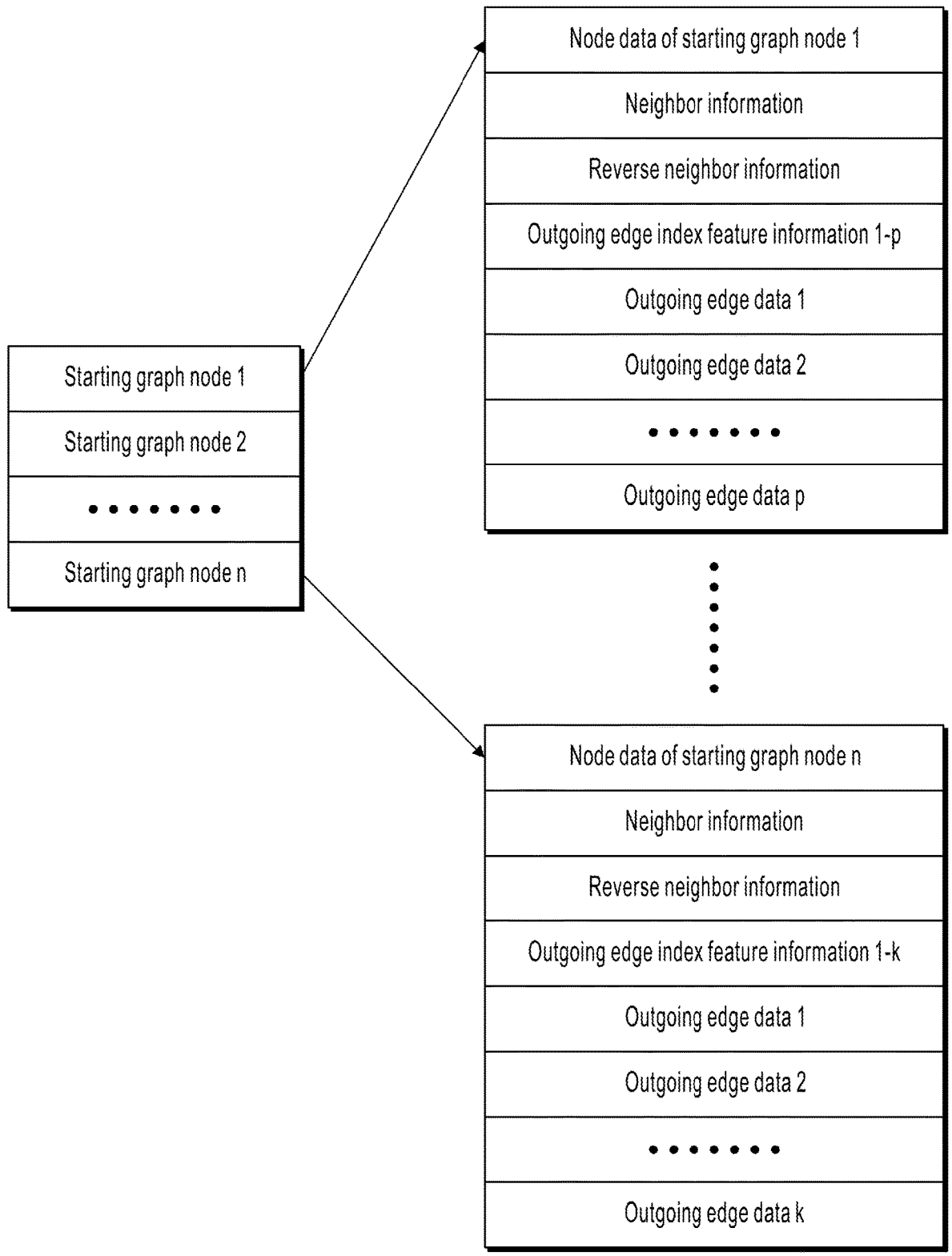
FIG. 4 is an exemplary diagram showing a non-ultra-large node data storage process according to an embodiment of the present disclosure.

FIG. 4 shows an exemplary diagrammatic representation of a non-ultra-large node data storage process according to an embodiment of the present disclosure. As shown in FIG. 4, there exist n starting graph nodes in the directed graph graph data, and node data, neighbor information, outgoing edge index feature information, and outgoing edge data of each starting graph node are independently stored in a first starting graph node data fragment.

Figure 5:
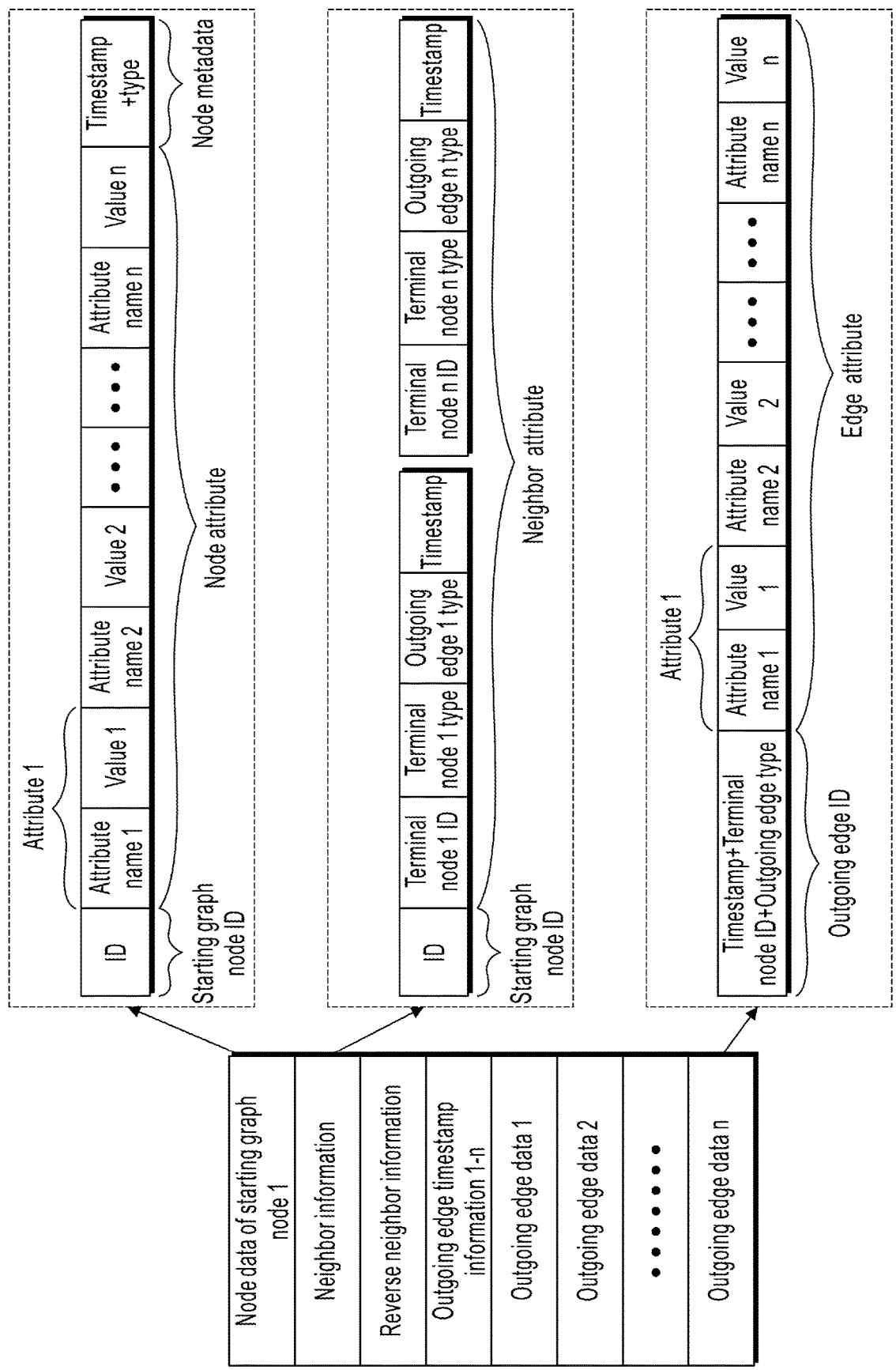
FIG. 5 is a diagram showing an example of a first starting graph node data fragment according to an embodiment of the present disclosure.

FIG. 5 shows an example diagram of a first starting graph node data fragment in an embodiment according to the present specification.

As shown in FIG. 5, the first starting graph node data fragment can store node data, neighbor information, outgoing edge index feature information 1 to n and outgoing edge data 1 to n of the starting graph node. For example, the first starting graph node data fragments can be formed as a first data structure having multiple fields, wherein each field of the first data structure is respectively used to store node data, neighbor information, outgoing edge index feature information 1 to n and outgoing edge data 1 to n of the starting graph node. In addition, reverse neighbor information can also be stored in the first starting graph node data fragment. The content of the reverse neighbor information can be the same as that of the neighbor information.

The node data of the starting graph node can include a node identifier (node ID) of the starting graph node, node attributes, and node meta-data. The node attributes of the starting graph node can include one or more node attributes. Each node attribute can include an attribute name and an attribute value. The attribute name can, for example, include "age", "height", "occupation", and the like. The attribute value is a corresponding value of the attribute name. The attribute name can be used to establish an index, thereby supporting condition filtering when performing data querying. The node meta-data of the starting graph node can include an index feature of the starting graph node, for example, a node timestamp. In one example, the node meta-data of the starting graph node can further include a node type. The node type can, for example, be a feature information for implementing node classification, for example, "person", "company", "device", and the like. In the example of FIG. 5, the node meta-data includes a timestamp and a node type. In addition, in other implementations, the node data can also not include the node metadata.

Neighbor information may include a node ID of a starting graph node and neighbor attributes. The neighbor attributes may include basic information of all outgoing edges of the starting graph node. Basic information of each outgoing edge may include a node ID (terminal node ID) of a terminal graph node of the outgoing edge and an outgoing edge index feature of the outgoing edge. In one example, basic information of each outgoing edge may be sequentially stored in the neighbor information according to the corresponding storage order of the outgoing edge index feature of each outgoing edge in the outgoing edge index feature information. In the example of FIG. 5, the outgoing edge index feature is an outgoing edge timestamp. Additionally, neighbor information of the starting graph node may further include a terminal node type and an outgoing edge type of the terminal graph node.

In some embodiments, the outgoing edge index feature information can include an outgoing edge index feature of all the outgoing edges of the starting graph node after being sorted. The order in which the outgoing edge data are stored in the starting graph node data fragment is the same as the order in which the outgoing edge index feature is stored in the outgoing edge index feature information. For example, a storage location (e.g., a field) for storing the outgoing edge index feature information can include multiple outgoing edge index feature storage locations, each of which is used to store an outgoing edge index feature, and each of the outgoing edge index feature storage locations can index a corresponding outgoing edge data in the subsequent data, that is, the storage location can act as a data index of the outgoing edge data. As shown in FIG. 5, the outgoing edge index feature information includes n storage locations for storing outgoing edge index features, among which, a kth storage location is corresponding to the kth outgoing edge data in the subsequent data, 1≤k≤n, and k is a positive integer. For example, when the data index feature is a timestamp, all outgoing edge timestamps of all outgoing edges can be saved in descending order in the outgoing edge timestamp information. Then, when the outgoing edge data are stored, each of the outgoing edge data can be stored in sequence according to the order in which the corresponding timestamp is saved in the outgoing edge timestamp information.

The outgoing edge data can include an outgoing edge identifier and an outgoing edge attribute. The outgoing edge identifier can include a node identifier of the terminal graph node (terminal node ID) and an outgoing edge index feature. In addition, the outgoing edge identifier can include an outgoing edge type. The outgoing edge type can be, for example, feature information for implementing edge classification. For example, when the outgoing edge indicates an account transfer, the outgoing edge type can be "account transfer". When the outgoing edge indicates a payment, the outgoing edge type can be "payment". The outgoing edge attribute can include one or more outgoing edge attributes. Each outgoing edge attribute can include an attribute name and an attribute value. The attribute name of the outgoing edge attribute can, for example, include "amount", "currency", "operating device", etc. The attribute value refers to the corresponding value of the attribute name.

Figure 6:
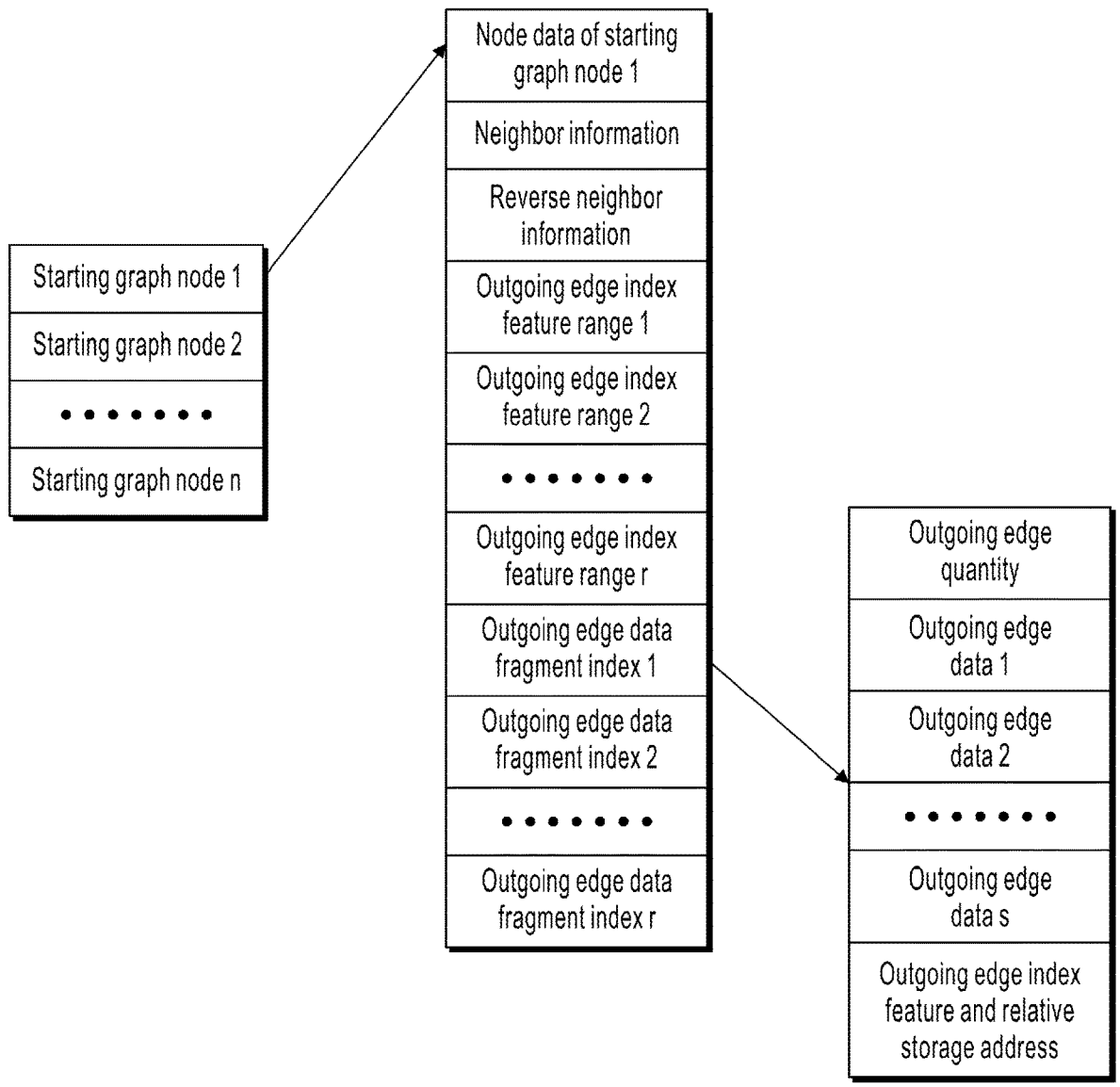
FIG. 6 shows an example flow chart of an ultra-large node data storage process according to an embodiment of the present disclosure.

Returning to FIG. 2, at step 240, for each starting graph node, when the determined data storage mode is ultra-large node data storage, the node data, neighbor information, outgoing edge index feature range information, and outgoing edge data fragment index of the starting graph node are stored in the second starting graph node data fragment in the second data storage medium. For example, the second starting graph node data fragments can be formed as a second data structure having multiple fields, and each field in the second data structure is respectively used to store the node data, neighbor information, outgoing edge index feature range information, and outgoing edge data fragment index of the starting graph node. The outgoing edge index feature range information can include multiple outgoing edge index feature ranges having a mapping relationship with the outgoing edge data fragment index, so that each outgoing edge index feature range information can index an outgoing edge data fragment index. For example, the storage order of each outgoing edge index feature range information can correspond to an outgoing edge data fragment index. Each outgoing edge index feature range can store a maximum outgoing edge index feature value and a minimum outgoing edge index feature value in a corresponding outgoing edge data fragment. In addition, the outgoing edge data and the outgoing edge data storage address information of the starting graph node are stored in at least two outgoing edge data fragments in the third data storage medium. The outgoing edge data storage address information includes a binary array <outgoing edge index feature of outgoing edge data, relative storage address of outgoing edge data in the outgoing edge data fragment>. In other words, each outgoing edge data fragment can be formed as a third data structure having multiple fields, and each field in the third data structure is respectively used to store at least two outgoing edge data and corresponding outgoing edge data storage address information, as shown in FIG. 6. Here, the relative storage address of the outgoing edge data in the outgoing edge data fragment can be an offset relative to the starting address of the outgoing edge data fragment. It should be noted that the outgoing edge data are stored in the outgoing edge data fragment before the outgoing edge data storage address information. In addition, the outgoing edge data fragment can also store an outgoing edge quantity. In this case, the outgoing edge number is stored in the head of the outgoing edge data fragment, that is, stored before all outgoing edge data.

FIG. 6 illustrates an exemplary flow chart of an ultra-large node data storage process according to an embodiment of the present disclosure. The definition and storage contents of the node data, neighbor information, and outgoing edge data of the starting graph node in the flow chart of FIG. 6 are completely the same as the node data, neighbor information, and outgoing edge data in the flow chart of FIG. 5, and thus are not described again.

In the case that the outgoing edge index feature is a timestamp, the outgoing edge index feature range information includes multiple sorted outgoing edge timestamp ranges, each of which stores a maximum and minimum outgoing edge timestamp of a corresponding outgoing edge data fragment. The outgoing edge data fragment index is used to store index information of the outgoing edge data fragment. For example, the outgoing edge data fragment index can be used to store a starting storage address (i.e., a storage first address) of the outgoing edge data fragment in the third data storage medium.

Figure 7:
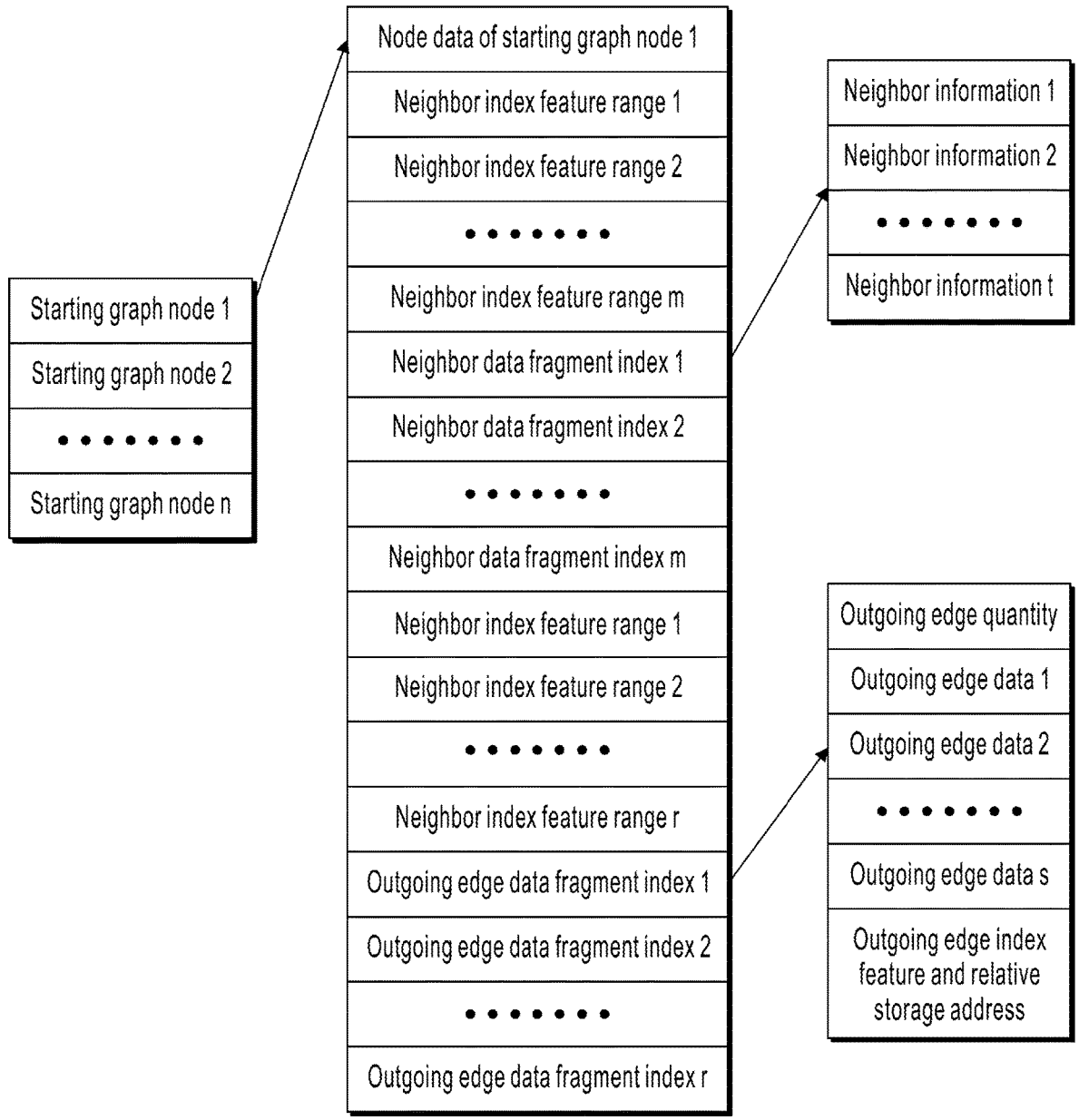
FIG. 7 shows another exemplary flowchart of an ultra-large node data storage process according to an embodiment of the present specification.

For each of the starting graph nodes whose neighbor quantity exceeds a predetermined threshold, if the determined data storage mode is the ultra-large node data storage mode, when performing graph data storage on the starting graph nodes of this type, the node data of the starting graph node, the neighbor index feature range, the neighbor data fragment index, the outgoing edge index feature range information, and the outgoing edge data fragment index are stored in the second starting graph node data fragment of the second data storage medium, the neighbor information is respectively stored in the fourth data storage medium in at least two neighbor data fragment, and the outgoing edge data and the outgoing edge data storage address information of the starting graph node are stored in at least two outgoing edge data fragment of the third data storage medium. Similarly, the neighbor index feature range includes multiple neighbor index feature ranges that form a mapping relationship with the neighbor data fragment index, so that each neighbor index feature range can index a neighbor data fragment index. For example, the storage order of each neighbor index feature range information can correspond to a neighbor data fragment index, so that a neighbor index feature range stored in the storage order can be mapped to the neighbor data fragment index corresponding to the storage order. In one example, each neighbor index feature range is used to store the maximum index feature value and the minimum index feature value of a corresponding neighbor data fragment. The neighbor data fragment index is used to save the index information of the neighbor data fragment. For example, the neighbor data fragment index can be used to save the starting storage address (i.e., the storage first address) of the neighbor data fragment in the fourth data storage medium. FIG. 7 shows another example flow chart of the ultra-large node data storage process according to an embodiment of the present specification.

It should be noted that in an example, after the graph data of the starting graph node are stored in the first starting graph node data fragment or the second starting graph node data fragment, a data fragment index of the first starting graph node data fragment or the second starting graph node data fragment can be generated based on the node identifier of the starting graph node. For example, a perfect hash value of the node identifier of the starting graph node is calculated, the perfect hash value is taken modulo by the number of nodes of the starting graph node, and the value after the modulo processing is used as a data fragment index of the first starting graph node data fragment or the second starting graph node data fragment.

It should be noted that, in some embodiments, part of the first data storage medium, part of the second data storage medium, part of the third data storage medium, and/or part of the fourth data storage medium can be implemented by the same data storage medium. In addition, in some embodiments, the non-ultra-large node data storage and the ultra-large node data storage can be implemented by a key-value storage mode. An example of the key-value storage mode can include, but is not limited to, key-value storage mode implemented based on perfect hash technology, key-value storage mode based on LevelDB, key-value storage mode based on RocksDB, and key-value storage mode based on Redis.

The data storage process of the embodiment according to the present specification is described above with reference to the drawings. After data are stored in the database system by using the above data storage method, data queries can be performed in response to a data query request initiated by a user.

Figure 8:
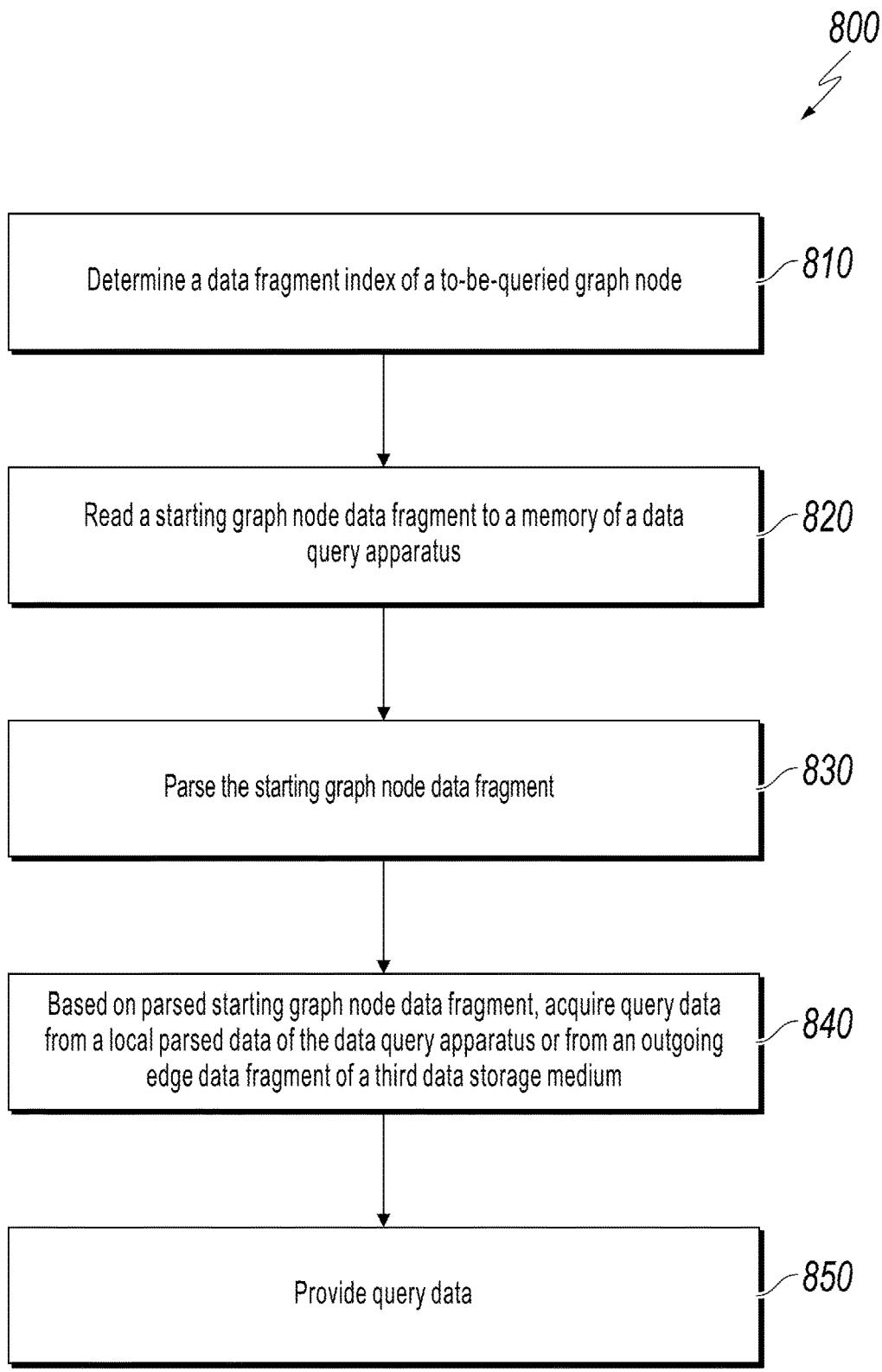
FIG. 8 shows an example flow chart of a data query method according to an embodiment of the present disclosure.

FIG. 8 is an exemplary flowchart illustrating a data query process 800 according to an embodiment of the present disclosure.

As shown in FIG. 8, in 810, based on the node identifier of the target query graph node, a data fragment index of the to-be-queried graph node is determined in response to receiving a data query request initiated by the user. The data fragment index is used to index the corresponding starting graph node data fragment stored in the data storage medium. For example, by calculating a perfect hash value of the node identifier of the target query graph node and taking modulo of the perfect hash value by the number of nodes of the starting graph node, a data fragment index of the to-be-queried graph node can be determined.

In 820, the starting graph node data fragment that is indexed by the data fragment index is read from the first data storage medium or the second data storage medium into a memory of the data query apparatus and is parsed.

In 830, according to a parsed starting graph node data fragment, query data are acquired from a local parsed data of the data query apparatus or from an outgoing edge data fragment of a third data storage medium. The process of acquiring the query data will be detailedly described below with reference to the accompanying drawings.

In 840, the query data obtained are provided to the user.

Figure 9:
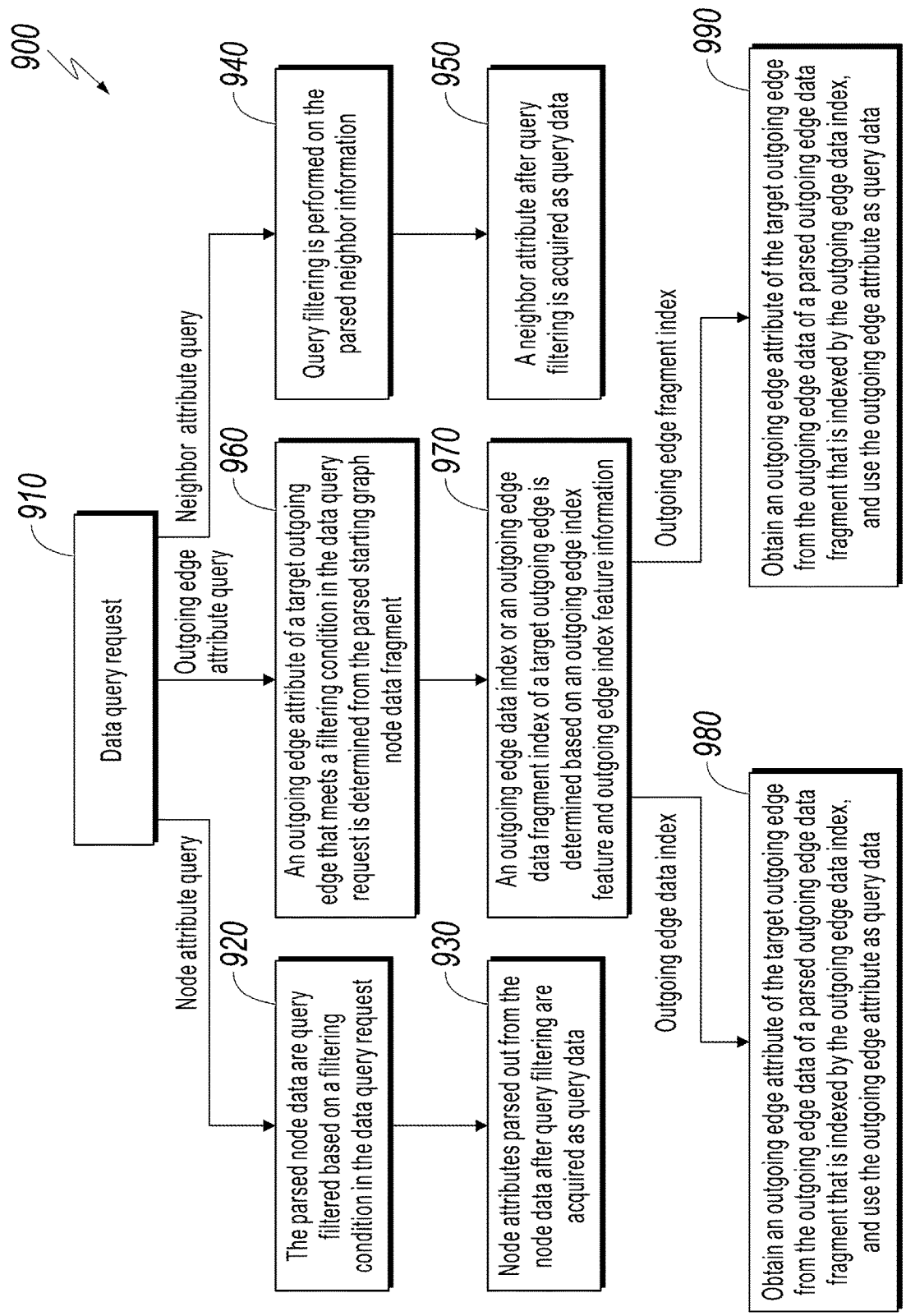
FIG. 9 is an exemplary flow chart of a query data acquisition process according to an embodiment of the present disclosure.

FIG. 9 shows an example flow chart of a query data acquisition process 900 according to an embodiment of the present disclosure. In the example of FIG. 9, node data include a node identifier of a starting graph node, node attributes, and node metainformation. Node metainformation includes a node index feature of the starting graph node. Neighbor information includes a node identifier of the starting graph node and neighbor attributes. Neighbor attributes include basic information of all outgoing edges, and basic information of each outgoing edge includes a node identifier of a terminal graph node of the outgoing edge and an outgoing edge index feature of the outgoing edge. Edge data include outgoing edge identifiers and outgoing edge attributes. The edge identifier includes a node identifier of the terminal graph node and an outgoing edge index feature. Additionally, node metainformation can also include a node type.

As shown in FIG. 9, at 910, a data query request is received. At 920, in response to the data query request indicating a querying of node attributes of a graph node, the parsed node data are query filtered based on a filtering condition in the data query request. For example, assuming that a filtering condition in the data query request is an index feature (e.g., a timestamp), the node index feature in node metadata parsed out from the node data can be used for query filtering. In addition, when the data query request includes a node type, the index feature in node metadata parsed out from the node data and the node type can be used for query filtering. In other examples, the data query request can also include other filtering conditions. At 930, node attributes parsed out from the node data after query filtering are acquired as query data. In another example, the data query request can also not include a filtering condition, so that when node attributes are acquired, query filtering can be omitted, and all node attributes parsed out from the node data can be acquired as query data.

In 940, query filtering is performed on the neighbor information parsed out in response to the data query request indicating querying a neighbor attribute of a graph node, based on the filtering condition in the data query request. The query filtering of the neighbor information can use a query filtering method similar to node data filtering. In a case where the neighbor attribute includes a terminal node identifier, a terminal node type, an outgoing edge type, and an outgoing edge index feature, query filtering can be performed using the terminal node identifier, the terminal node type, the outgoing edge type, and the outgoing edge index feature. In other examples, the data query request can also include other filtering conditions. In 950, a neighbor attribute after query filtering is acquired as query data. In another example, the data query request can also not include filtering conditions, so that query filtering can be omitted when acquiring the neighbor attribute, and all neighbor attributes in the parsed-out neighbor information can be acquired as query data.

In one example, when the determined data storage mode is the ultra-large node data storage and the number of the neighbor nodes of the respective starting graph nodes is greater than a predetermined threshold, the second starting graph node data fragment stores the node data of the starting graph node, neighbor index feature ranges, neighbor data fragment indexes, outgoing edge index feature range information, and outgoing edge data fragment indexes, and neighbor information of the starting graph nodes are respectively stored in at least two neighbor data fragments in the fourth data storage medium.

Figure 10:
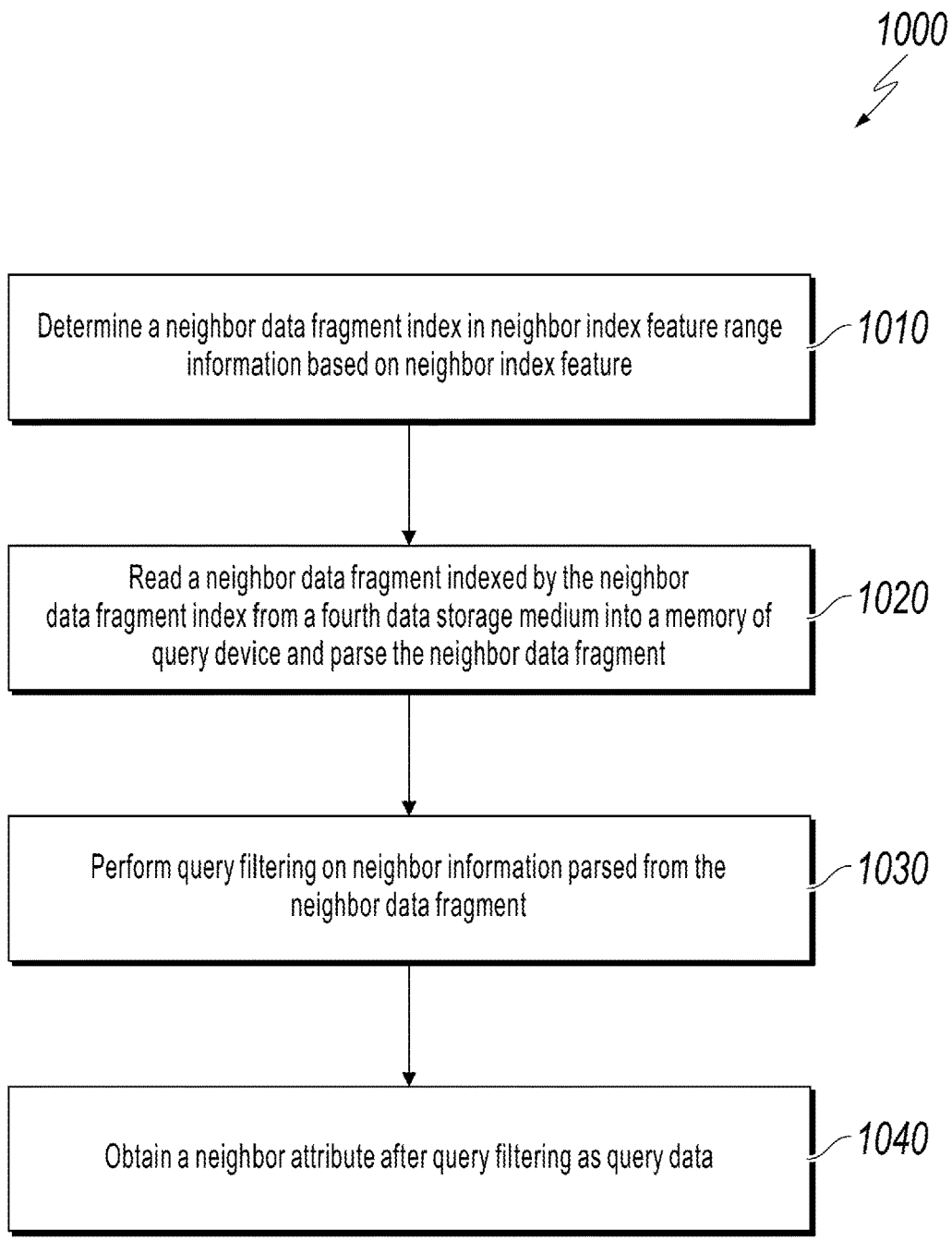
FIG. 10 is an exemplary flow chart of a method for obtaining neighbor attributes from a neighbor data fragment of a fourth data storage medium according to an embodiment of the present disclosure.

FIG. 10 is an exemplary flow chart of a method 1000 for retrieving neighbor attributes from a neighbor data fragment of a fourth data storage medium according to an embodiment of the present disclosure.

As shown in FIG. 10, in 1010, in response to the data query request indicating to query the neighbor attribute of the graph node, a neighbor data fragment index in the neighbor index feature range information is determined based on the neighbor index feature.

At 1020, the query device reads the neighbor data fragment indexed by the neighbor data fragment index from the fourth data storage medium into a memory of the query device and parses the neighbor data fragment.

In 1030, based on a filtering condition in the data query request, perform query filtering of neighbor information parsed out from a neighbor data fragment.

At 1040, obtain a neighbor attribute after query filtering as query data.

Similarly, in the example of FIG. 10, the data query request can also not include the filtering condition, so that all neighbor attributes parsed out from the neighbor data fragment can be taken as the query data.

Returning to FIG. 9, in 960, in response to the data query request indicating a query of the outgoing edge attribute of the graph node, an outgoing edge attribute of a target outgoing edge that meets a filtering condition in the data query request is determined from the parsed starting graph node data fragment. For example, the query filtering can be performed based on the neighbor information in the parsed starting graph node data fragment to find the terminal node ID meeting the filtering condition. The query filtering process can be the same as the query filtering process referenced above for the neighbor attribute query. Then, an outgoing edge index feature corresponding to the terminal node ID found is extracted. In another example, query filtering is not performed when the data query request does not include the filtering condition.

In 970, an outgoing edge data index of a target outgoing edge is determined based on an outgoing edge index feature and outgoing edge index feature information, or an outgoing edge data fragment index of a target outgoing edge is determined based on an outgoing index feature and outgoing index feature range information. In a case where the index feature is a timestamp, an outgoing edge timestamp can be used to determine the outgoing edge data index of a target outgoing edge using a binary search method, or an outgoing edge timestamp range information can be used to determine an outgoing edge data fragment index of a target outgoing edge.

In 980, in response to determining the outgoing edge data index of the target outgoing edge, obtain an outgoing edge attribute of the target outgoing edge from the outgoing edge data of a parsed outgoing edge data fragment that is indexed by the outgoing edge data index, and use the outgoing edge attribute as query data.

In 990, in response to determining the outgoing edge data fragment index of the target outgoing edge, obtain an outgoing edge attribute of the target outgoing edge from an outgoing edge data fragment of a third storage medium that is indexed by the outgoing edge data fragment index, and use the outgoing edge attribute as query data.

Figure 11:
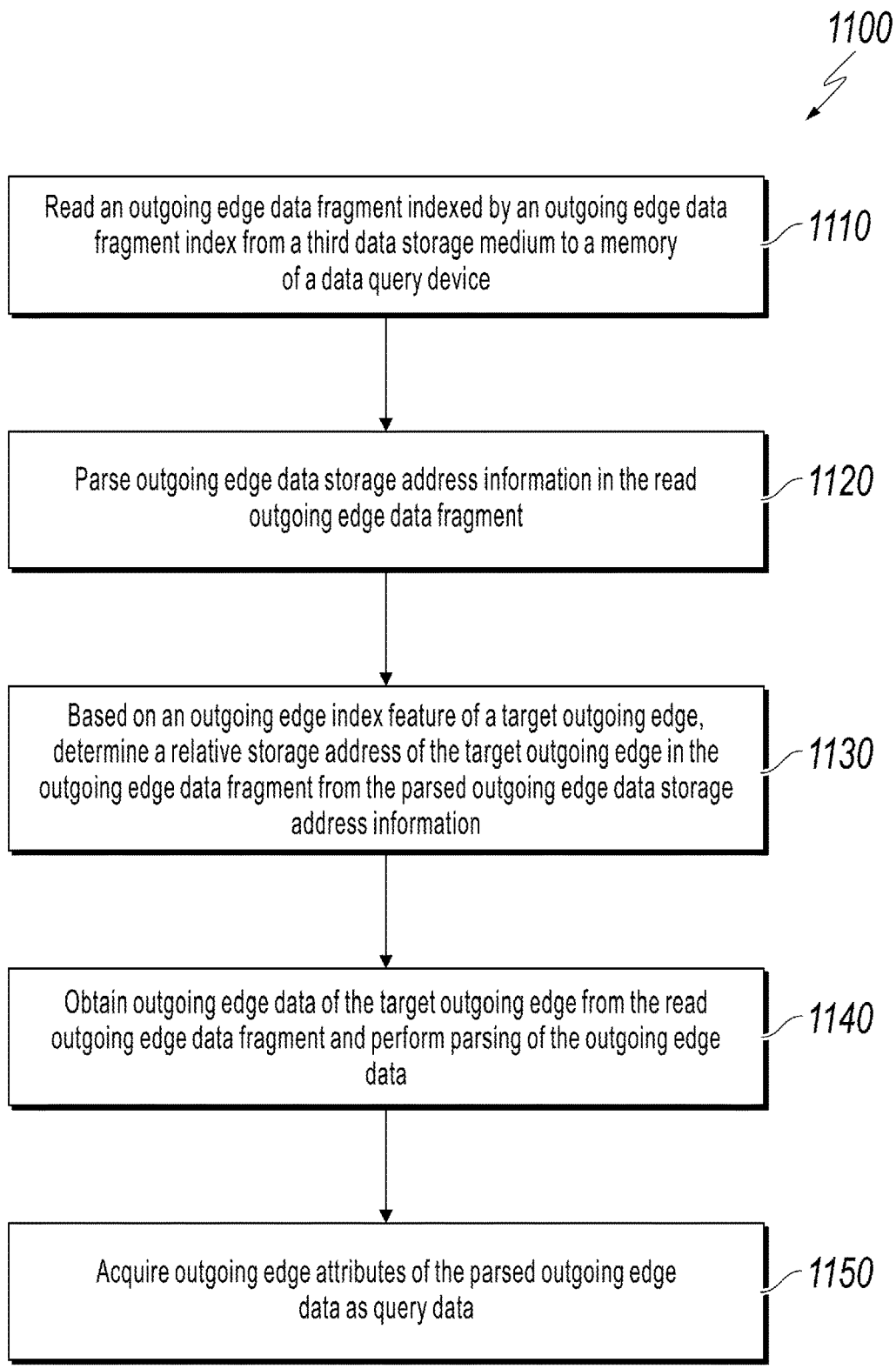
FIG. 11 is an example flow chart of an example method of obtaining an outgoing edge attribute from an outgoing edge data fragment of a third data storage medium according to an embodiment of the present disclosure.

FIG. 11 is an exemplary flow chart of method 1100 for retrieving outgoing edge attribute from outgoing edge data fragments of a third data storage medium according to an embodiment of the present disclosure.

As shown in FIG. 11, in 1110, the outgoing edge data fragment indexed by the outgoing edge data fragment index is read from a third data storage medium to a memory of the data query device.

In 1120, parse outgoing edge data storage address information in the read outgoing edge data fragment. In an embodiment of the present specification, the outgoing edge data storage address information is generally stored at the terminal node position of the outgoing edge data fragments, that is, stored after the outgoing edge data fragments. When parsing the outgoing edge data fragments, data can be parsed from the terminal node position to the starting position, thereby obtaining the outgoing edge storage address information in the outgoing edge data fragments first. In addition, the outgoing edge data fragments can also store the outgoing edge number. Based on the outgoing edge number, the outgoing edge data storage address information can be easily extracted from the outgoing edge data fragments.

In 1130, based on an outgoing edge index feature of a target outgoing edge, determine a relative storage address of the outgoing edge target in the outgoing edge data fragment from the parsed outgoing edge data storage address information.

In 1140, based on the determined relative storage address, obtain outgoing edge data of the target outgoing edge from the read outgoing edge data fragment and perform parsing of the outgoing edge data.

In 1150, acquire outgoing edge attributes of the parsed outgoing edge data as query data.

According to the query data acquisition method described above, by first parsing to obtain address information of the outgoing edge data in the outgoing edge data fragment (i.e., partially parsing), and based on the outgoing index feature of the target outgoing, determining a relative storage address of the target outgoing in the outgoing edge data fragment, the target outgoing edge data can be obtained and further parsed from the outgoing edge data fragment by merely parsing the target outgoing edge data, without obtaining and parsing the remaining outgoing edge data, thereby greatly reducing a data processing amount of the data query process, and thus improving the efficiency of the data query.

It should be noted that in an example, the neighbor attribute of the neighbor information includes an outgoing edge index feature and an outgoing edge type, and the outgoing edge identifier includes an outgoing edge index feature, a terminal node identifier, and an outgoing edge type. In this case, after finding the terminal node identifier and extracting the corresponding outgoing edge index feature, an outgoing edge data index or an outgoing edge data fragment index is determined based on the outgoing edge index feature. After querying the outgoing edge data of the target outgoing edge indexed by the outgoing edge data index or the outgoing edge data segment index, it is needed to match each data item of the target outgoing edge based on the edge index feature, the terminal node identifier, and the outgoing edge type obtained in the above neighbor attribute processing (i.e., the terminal node ID searching processing). If there is a matched outgoing edge data, an outgoing edge attribute of the matched outgoing edge data is obtained as query data. In a case where non-ultra-large node data are stored, since the starting graph node data fragment is extracted at one time, an outgoing edge attribute of a matched outgoing edge data obtained in the local extraction can be obtained as query data. In a case where ultra-large node data are stored, if there is a matched outgoing edge data, the matched outgoing edge data are read from the outgoing edge data fragment and are parsed, and then, an outgoing edge attribute of parsed outgoing edge data is obtained as query data. For unmatched outgoing edge data, no outgoing edge attribute is obtained. By using methods mentioned above, by using edge index features, a terminal node identifier, and an outgoing edge type to perform a match again on outgoing edge data the need to be obtained, and obtaining query data by parsing matched data, outgoing edge data obtained can be more accurate, and further reduce the amount of data to be parsed in the parsing processing, thereby further improving a query efficiency of graph data.

According to the data storage and query solutions described above, when the range of neighbor nodes of a graph node is not large, the node data, neighbor information, outgoing edge index feature information and outgoing edge data of the graph node are stored in the same data fragment, so that data query can be performed by performing data query on a data storage medium through a single I/O read operation. In addition, when the range of neighbor nodes of a starting graph node is relatively large, the node data, neighbor information, outgoing edge index feature range information and outgoing edge data fragment index of the starting graph node are stored in a second data storage medium in a second starting graph node data fragment, and the outgoing edge data and the outgoing edge data storage address information of the starting graph node are stored in at least two outgoing edge data fragments in a third data storage medium. Data query can be performed by performing data query on the data storage medium through two I/O read operations. According to the processing solutions described above, the number of I/O read operations in data query of graph data can be greatly reduced, thereby reducing the time of data query of graph data and improving the efficiency of data query of graph data.

In addition, according to the above data storage and query solutions, storage is implemented in the form of node-edge mixed storage, so that the entire graph data storage process only needs to support one data storage structure, thereby making the data storage structure of each storage service terminal the same, so that the data update pressure of each storage service terminal is balanced.

In addition, by using the above data storage and query solution, in the case where the number of neighbors is relatively large, the neighbor information is stored in multiple neighbor data fragments, and in the data query process, a plurality of target neighbor data fragments are read according to needs to perform parse processing, thereby reducing the data processing quantity in the data query process, thereby improving the data query efficiency.

Figure 12:
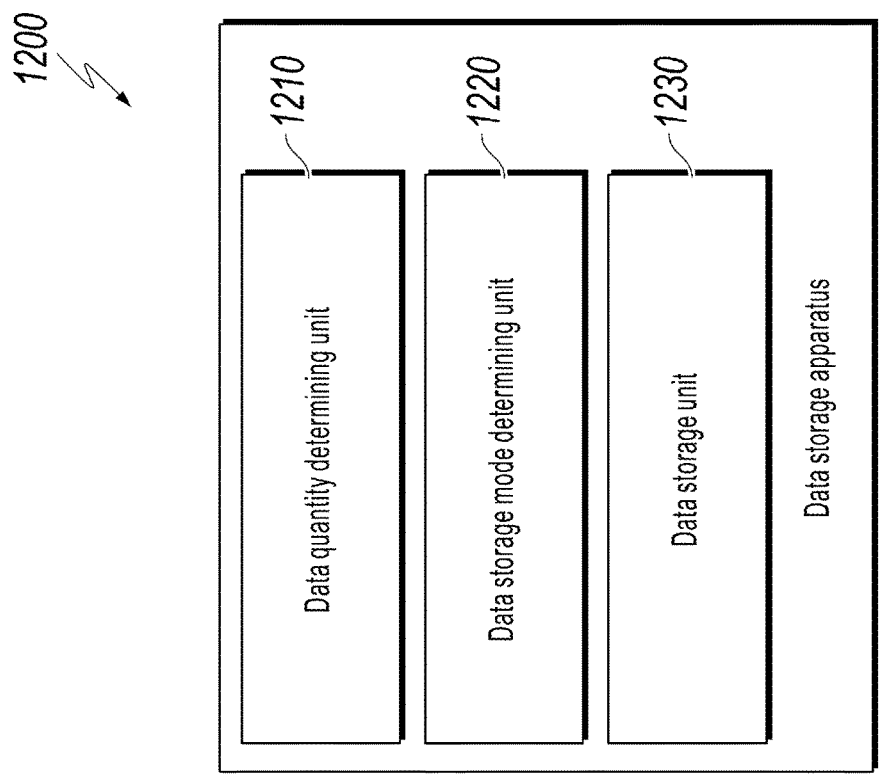
FIG. 12 is a fragment diagram of an example of a data storage apparatus according to an embodiment of the present disclosure.

FIG. 12 shows an exemplary fragment diagram of a data storage apparatus 1200 according to an embodiment of the present disclosure. As shown in FIG. 12, the data storage apparatus 1200 can include a node quantity determining unit 1210, a data storage mode determination unit 1220, and a data storage unit 1230.

The node quantity determining unit 1210 is configured to determine the number of neighboring graph nodes of each starting graph node in the directed graph graph data to be stored.

The data storage mode determining unit 1220 is configured to determine a data storage mode according to a number of neighboring graph nodes of each starting graph node. In one example, the data storage mode determining unit 1220 determines the data storage mode relative to all starting graph nodes in the directed graph graph data. In another example, the data storage mode determining unit 1220 determines the data storage mode relative to each starting graph node in the directed graph graph data respectively.

For each starting graph node, when the determined data storage mode is non-ultra-large node data storage, the data storage unit 1230 is configured to store the node data, neighbor information, outgoing edge index feature information, and outgoing edge data of the starting graph node to a first starting graph node data fragment of a first data storage medium, wherein the outgoing edge index feature information comprises outgoing edge index features of all outgoing edges, and each outgoing edge index feature forms a mapping relationship with an outgoing edge index for indexing the outgoing edge data stored in the first starting graph node data fragment.

For each starting graph node, when the determined data storage mode is the ultra-large node data storage, the data storage unit 1230 is configured to store the node data, neighbor information, outgoing edge index feature range information, and outgoing edge data fragment index of the starting graph node in a second starting graph node data fragment of the second data storage medium, the outgoing edge index feature range information including multiple outgoing edge index feature ranges having a mapping relationship with the outgoing edge data fragment index, each outgoing edge index feature range information being used to index an outgoing edge data fragment index, and store the outgoing edge data and outgoing edge data storage address information of the starting graph node in at least two outgoing edge data fragments of the third data storage medium, the outgoing edge data storage address information including a binary array <outgoing edge index feature of outgoing edge data, relative storage address of outgoing edge data in the outgoing edge data fragment>.

In an example, the data storage unit 1230 can further store the reverse neighbor information in the first starting graph node data fragment and the second starting graph node data fragment.

In an example, for each starting graph node whose number of neighbors exceeds a predetermined threshold, when the determined data storage mode is a ultra-large node data storage, the data storage unit 1230 can store the node data of the starting graph node, the neighbor index feature range, the neighbor data fragment index, the outgoing edge index feature range information, and the outgoing edge data fragment index in a second starting graph node data fragment of the second data storage medium, store the neighbor information in at least two neighbor data fragments of the fourth data storage medium, and store the outgoing edge data and the outgoing edge data storage address information of the starting graph node in at least two outgoing edge data fragments of the third data storage medium.

Figure 13:
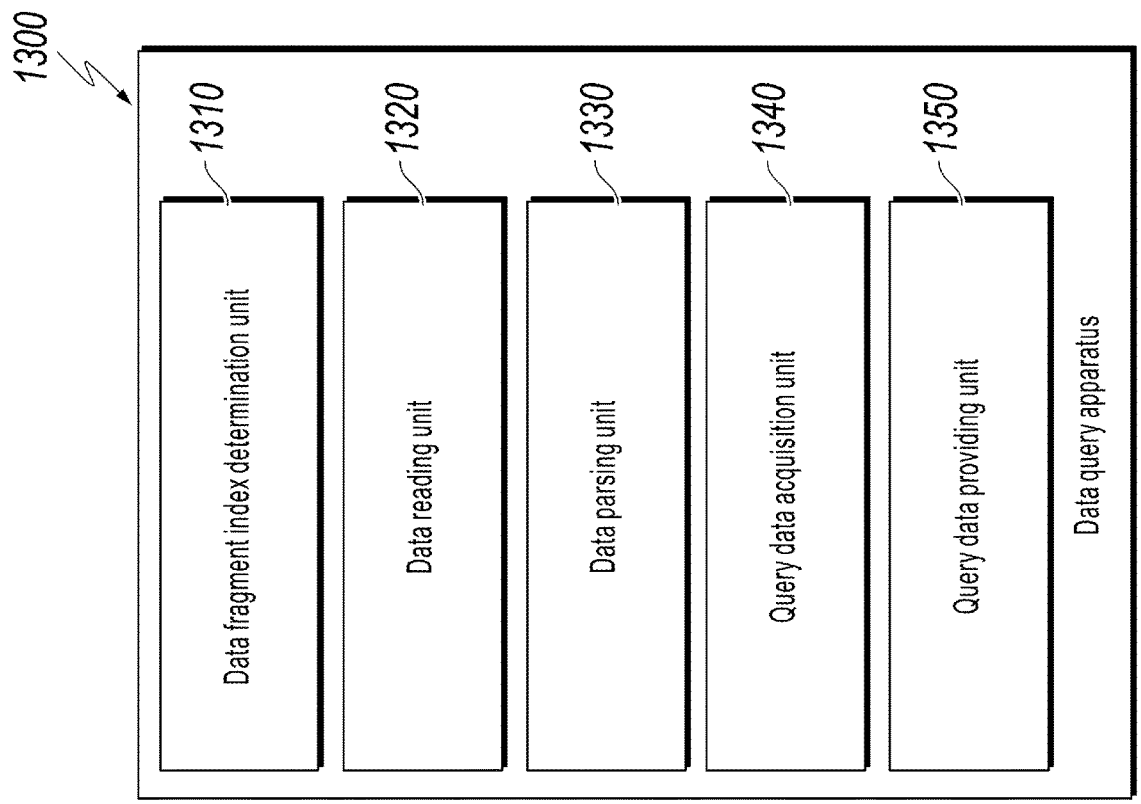
FIG. 13 is a fragment diagram of an example of a data querying apparatus according to an embodiment of the present disclosure.

FIG. 13 illustrates an exemplary fragment diagram of a data query apparatus 1300 according to an embodiment of the present disclosure. As shown in FIG. 13, the data query apparatus 1300 includes a data fragment index determination unit 1310, a data reading unit 1320, a data parsing unit 1330, a query data acquisition unit 1340, and a query data providing unit 1350.

The data fragment index determining unit 1310 is configured to, in response to receiving a user initiated data query request, determine a data fragment index of a to-be-queried graph node based on a node identifier of the to-be-queried graph node.

The data reading unit 1320 is configured to read a corresponding starting data fragment of the data fragment index from the first data storage medium or the second data storage medium into the memory of the data query device.

The data parsing unit 1330 is configured to parse the read starting graph node data fragments.

Query data acquisition unit 1340 is configured to acquire query data for a query request for query data in local data parsed by the data query apparatus or in an outgoing edge data fragment from the third data storage medium according to the parsed starting graph node data fragments.

The query data providing unit 1350 is configured to provide the query data acquired to the user.

In one example, the node data includes a node identifier of the starting graph node and node attributes. The neighbor information includes a node identifier of the starting graph node and neighbor attributes. The outgoing edge data includes an outgoing edge identifier and outgoing edge attributes.

In response to the data query request indicating to query node attributes of the graph node, the query data acquisition unit 1340 acquires node attributes of the node data of the parsed starting graph node data fragment, and uses the node attributes as the query data.

In response to the data query request indicating to query the neighbor attributes of the graph node, the query data acquisition unit 1340 acquires the neighbor attribute of the starting graph node data fragment parsed out from the neighbor information of the starting graph node data fragment, as the query data.

In response to the data query request indicating to query the outgoing edge attribute of the target outgoing edge, the query data acquisition unit 1340 determines an outgoing edge index feature of the target outgoing edge based on the parsed starting graph node data fragment, and determines an outgoing edge data index of the target outgoing edge based on the outgoing edge index feature and the outgoing edge index feature information, or determines an outgoing edge data fragment index of the target outgoing edge based on the outgoing edge index feature and the outgoing edge index feature range information. In response to determining the outgoing edge data index of the target outgoing edge, the query data acquisition query unit 1340 acquires the outgoing edge attribute of the target outgoing edge as the query data from the outgoing edge data indexed by the outgoing edge data index. In response to determining the outgoing edge data fragment index of the target outgoing edge, the data query unit 1340 acquires the outgoing edge attribute of the target outgoing edge as the query data from the outgoing edge data fragment indexed by the outgoing edge data fragment index.

In one example, the data query request may include filtering conditions. In response to the data query request indicating to query node attributes of a query graph node, the query data acquisition unit 1340 performs query filtering on the node data of the parsed starting graph node data fragments based on the filtering conditions included in the data query request, and acquires node attributes of the node data after query filtering as query data. In response to the data query request indicating to query node attributes of a query graph node, the query data acquisition unit 1340 performs query filtering on the parsed neighbor information based on the filtering conditions included in the data query request, and acquires neighbor attributes of the neighbor information after query filtering as query data. In response to the data query request indicating to query outgoing edge attributes of a query graph node, the query data acquisition unit 1340 determines an outgoing edge index feature of a target outgoing edge that meets the filtering conditions from the neighbor information parsed from the starting graph node data fragments. Then, the query data acquisition unit 1340 acquires an outgoing edge data index of the target outgoing edge based on the outgoing edge index feature and outgoing edge index feature information, or acquires an outgoing edge data fragment index of the target outgoing edge based on the outgoing edge index feature and outgoing edge index range information. In response to determining an outgoing edge data index of the target outgoing edge, the query data acquisition unit 1340 acquires an outgoing edge attribute of the target outgoing edge as query data from outgoing edge data indexed by the outgoing edge data index. In response to determining an outgoing edge data fragment index of the target outgoing edge, the query data acquisition unit 1340 acquires an outgoing edge attribute of the target outgoing edge as query data from outgoing edge data fragments in the third data storage medium that is indexed by the outgoing edge data fragment index.

In an example, the data reading unit 1320 reads the outgoing edge data fragment indicated by the outgoing edge data fragment index from the third data storage medium to the memory of the data query device in response to determining the outgoing edge of the target edge. After the outgoing edge data fragment is read to the memory of the data query device, the data parsing unit 1330 parses the outgoing edge data storage address information in the outgoing edge data fragment. The query data acquisition unit 1340 determines the relative storage address of the target outgoing edge in the outgoing edge data fragment based on the outgoing index feature of the target outgoing edge from the parsed outgoing edge data storage address information. Then, the query data acquisition unit 1340 acquires the outgoing edge data of the target outgoing edge from the read outgoing edge data fragment, parses the acquired outgoing edge data of the target outgoing edge, and acquires the outgoing edge attribute of the parsed target outgoing edge as query data.

In the case that the index feature is a timestamp, query data acquisition unit 1340 can determine an index information of the target outgoing edge data of the outgoing edge based on the outgoing edge timestamp using binary search in the outgoing edge timestamp information or determine an index information of the target outgoing edge data of the outgoing edge based on the outgoing edge timestamp range information using binary search.

In one example, when the number of neighbors of each starting graph node is greater than a preset threshold, and the determined data storage manner is an ultra-large node data storage, the second starting graph node data are stored in the starting graph node data, neighbor index feature range, neighbor data fragment index, outgoing edge index feature range information, and outgoing edge data fragment index, and the neighbor information is stored in at least two neighbor data fragments in the fourth data storage medium.

In this case, in response to the data query request indicating querying the neighbor attribute of the graph node, the query data acquisition unit 1340, based on the neighbor index feature and neighbor index feature range information, determines a neighbor data fragment index. After determining the neighbor data fragment index, the data reading unit 1320 reads the neighbor data fragment indicated by the neighbor data fragment index from the fourth data storage medium to a memory of the data query device. Then, the data parsing unit 1330 parses the read neighbor data fragment. The query data acquisition unit 1340, based on a filtering condition in the data query request, performs query filtering on the neighbor information in the parsed neighbor data fragment, and acquires the neighbor attribute in the filtered neighbor information after query filtering as the query data.

As described above in conjunction with FIGS. 1 to 13, data storage methods, data storage devices, data query methods, and data query devices according to embodiments of the present specification have been described. The above data storage devices and data query devices may be implemented by hardware, or by software, or by a combination of hardware and software.

Figure 14:
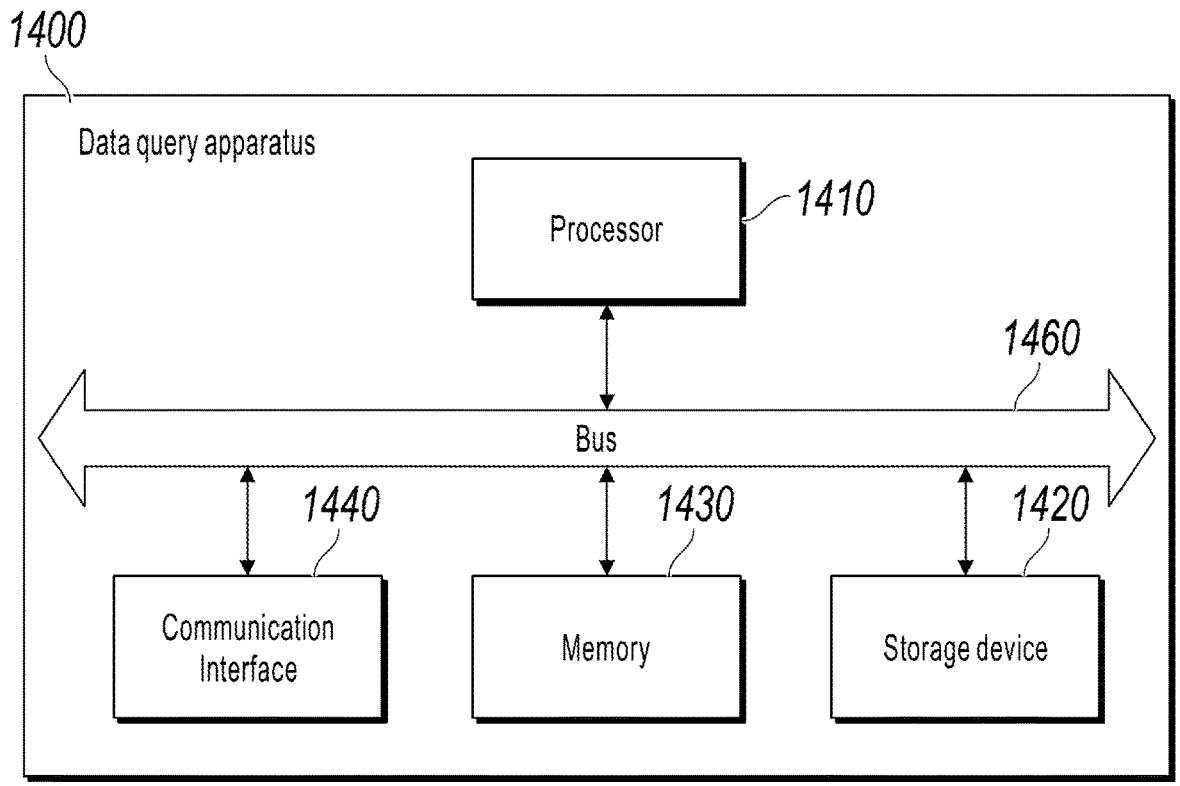
FIG. 14 is a diagram showing an example of a data storage apparatus implemented by a computer system according to an embodiment of the present disclosure.

FIG. 14 is a diagram showing a data storage apparatus 1400 implemented in a computer system according to an embodiment of the present disclosure. As shown in FIG. 14, the data storage apparatus 1400 can include at least one processor 1410, a storage device (e.g., a non-volatile storage device) 1420, a memory 1430 and a communication interface 1440, and at least one processor 1410, the storage device 1420, the memory 1430 and the communication interface 1440 are connected to each other via a bus 1460. The at least one processor 1410 executes at least one computer-readable instruction stored or encoded in the memory (i.e., the elements implemented in software form above).

In an implementation, computer-executable instructions are stored in a memory, and when executed by at least one processor 1410, cause the at least one processor 1410 to: determine a number of neighboring graph nodes of each starting graph node in the directed graph graph data to be stored; determine a data storage mode based on the number of neighboring graph nodes of each starting graph node; for each starting graph node, when the data storage mode is non-ultra-large node data storage, store node data, neighbor information, outgoing edge index feature information, and outgoing edge data of the starting graph node in a first starting graph node data fragment of a first data storage medium, the outgoing edge index feature information including outgoing edge index features of all outgoing edges of the starting graph node, and a mapping relationship is formed between each outgoing edge index feature and an outgoing edge data index for indexing corresponding outgoing edge data stored in the first starting graph node data fragment; and for each starting graph node, when the data storage mode is ultra-large node data storage, store node data, neighbor information, outgoing edge index feature range information, and outgoing edge data fragment index information of the starting graph node in a second starting graph node data fragment of a second data storage medium, the outgoing edge index feature range information including multiple outgoing edge index feature ranges having a mapping relationship with an outgoing edge data fragment index, and store outgoing edge data and outgoing edge data storage address information of the starting graph node in at least two outgoing edge data fragments, the outgoing edge data storage address information including a binary array <an outgoing edge index feature of outgoing edge data, and a relative storage address of outgoing edge data in an outgoing edge data fragment>.

It should be understood that the computer executable instructions stored in the memory, when executed, cause at least one processor 1410 to perform various operations and functions described in conjunction with FIGS. 1-7 and 12.

Figure 15:
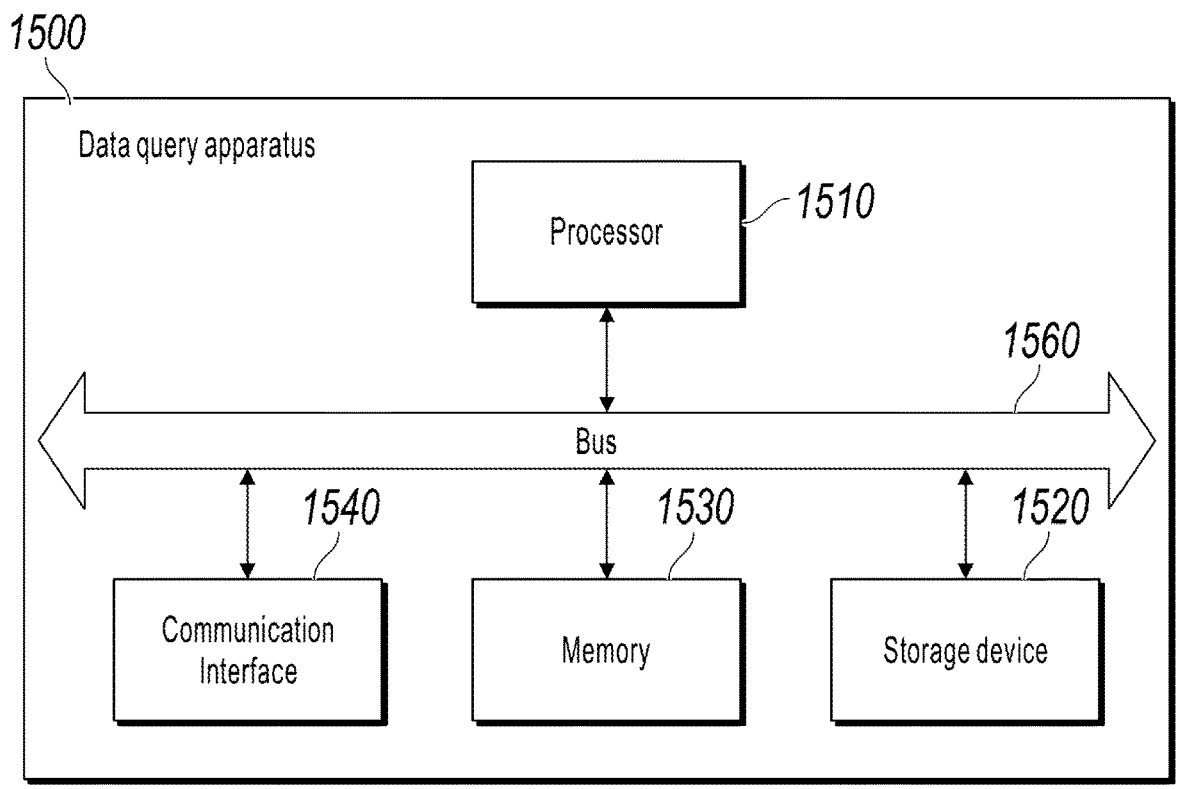
FIG. 15 is a diagram showing an example of a data query apparatus implemented in a computer system according to an embodiment of the present specification.

FIG. 15 is a diagram illustrating a data query apparatus 1500 implemented by a computer system according to an embodiment of the present disclosure. As shown in FIG. 15, the data query apparatus 1500 may include at least one processor 1510, a storage device (e.g., a nonvolatile storage device) 1520, a memory 1530 and a communication interface 1540, and the at least one processor 1510, the storage device 1520, the memory 1530 and the communication interface 1540 may be connected to each other via a bus 1560. The at least one processor 1510 executes at least one computer-readable instruction stored or encoded in the storage device (i.e., the element implemented in the form of software described above).

In one embodiment, computer executable instructions are stored in a memory that when executed causes at least one processor 1510 to: determine a data fragment index of a target graph node to be queried based on a node identifier of the target graph node to be queried in response to receiving a data query request initiated by a user; store the directed graph graph data according to the above-mentioned methods in the data storage medium; read a starting graph node data fragment indexed by the data fragment index from the first data storage medium or the second data storage medium into a memory of the data query device and parse the starting graph node data fragment; obtain query data of the data query request from the local parsed data of the data query device or from an outgoing edge data fragment of the third data storage medium based on the parsed starting graph node data fragment; and provide the query data to the user.

It should be understood that computer executable instructions stored in the memory cause a processor 1510 to perform the operations and functions described above in conjunction with FIGS. 8-11 and 13.

According to an embodiment, a program product such as a machine-readable medium (e.g., a non-volatile machine-readable medium) is provided. The machine-readable medium can have instructions (i.e., elements that are implemented in the form of software described above), such that when the machine executes the instructions, the machine performs various operations and functions described in conjunction with FIG. 1-13 above. Specifically, a system or device with a readable storage medium can be provided, where a software program code for implementing the function of any embodiment in the above embodiments is stored on the readable storage medium, and the computer or processor of the system or device reads and executes the instructions stored in the readable storage medium.

In this case, program code read from a readable medium itself can implement the function of any of the above-mentioned embodiment, thus the machine-readable code and the readable storage medium storing the machine-readable code are part of the invention.

The implementation of the readable storage medium includes a floppy disk, a hard disk, a magneto-optical disk, a disk (such as a CD-ROM, a CD-R, a CD-RW, a DVD-ROM, a DVD-RAM, a DVD-RW, a DVD-RW), a tape, a non-volatile storage card, and ROM. The program codes can be optionally downloaded from a server computer or a cloud by a communication network.

According to one embodiment, there is provided a computer program product, comprising a computer program which, when executed by a processor, causes the processor to perform the operations and functions described above in combination with FIGS. 1-13 in various embodiments of this specification.

One skilled in the art should understand that various modifications and variations can be made to the above-mentioned embodiments without deviating from the spirit of the invention. Therefore, the scope of protection of the present invention should be defined by the appended claims.

It should be noted that not all steps and units in the above flowcharts and system structure diagrams are necessary, and some steps or units can be ignored according to actual needs. The execution order of the steps is not fixed, and can be determined according to needs. The apparatus structure described in the above embodiments can be a physical structure or a functional structure, that is, some units may be implemented by the same physical entity, or some units may be implemented by multiple physical entities, or some components in multiple independent device s may be implemented together.

In the above embodiments, hardware units or modules can be implemented by a mechanical method or an electrical method. For example, a hardware unit, module, or processor can include a permanent dedicated circuit or logic (such as a dedicated processor, an FPGA, or an ASIC) to complete the corresponding operation. The hardware unit or processor can also include programmable logic or circuitry (such as a general-purpose processor or another programmable processor), which can be temporarily configured by software to complete the corresponding operation. Specific implementation methods (mechanical methods, or dedicated permanent circuits, or circuits temporarily configured by software) can be determined based on cost and time considerations.

The specific implementation methods described above in conjunction with the drawings are exemplary implementations, but do not represent all implementations that can be implemented or that fall within the scope of protection of the claims. The term "exemplary" used throughout this specification means "used as an example, an instance, or an example," and does not mean "preferable" or "advantageous" than other implementations. For the purpose of providing an understanding of the described technology, specific implementation methods include specific details. However, these technologies can be implemented without these specific details. In some instances, to avoid difficulty in understanding concepts of the described implementations, known structures and devices are shown in block diagram form.

The above description of the present disclosure is provided to enable any person skilled in the art to implement or use the present disclosure. Various modifications to the present disclosure are obvious to persons skilled in the art, and the general principles defined in this specification can also be applied to other variants without deviating from the scope of protection of the present disclosure. Therefore, the present disclosure is not limited to the exemplary and design descriptions in this text, but is consistent with the broadest scope of principles and practicability features that meet the principle and practicability features disclosed in this specification.

What is claimed is:

1. A computer-implemented method for data storage, comprising:

determining the number of neighboring graph nodes of each starting graph node in directed graph graph data to be stored;

determining a data storage mode is an ultra-large node data storage mode or not based on the number of neighboring graph nodes of each starting graph node;

for a first starting graph node, when the data storage mode is not the ultra-large node data storage mode, storing node data, neighbor information, outgoing edge index feature information, and outgoing edge data of the first starting graph node to a first starting graph node data fragment of a first data storage medium, wherein:

the outgoing edge index feature information comprises outgoing edge index feature information of all outgoing edges of the first starting graph node, and each outgoing edge index feature has a mapping relationship with an outgoing edge data index that is used for indexing corresponding outgoing edge data stored in the first starting graph node data fragment; or for a second starting graph node, when the data storage mode is the ultra-large node data storage mode, storing node data, neighbor information, outgoing edge index feature range information, and outgoing edge data fragment index of the second starting graph node in a second starting graph node data fragment in a second data storage medium, wherein the outgoing edge index feature range information comprises multiple outgoing edge index feature ranges having a mapping relationship with the outgoing edge data fragment index, and storing outgoing edge data and outgoing edge data storage address information of the second starting graph node in at least two outgoing edge data fragments in a third data storage medium, wherein the outgoing edge data storage address information comprises a two-dimensional array that comprises an outgoing edge index feature of the outgoing edge data and a relative storage address of the outgoing edge data in an outgoing edge data fragment.

2. The computer-implemented method according to claim 1, wherein the data storage mode is determined relative to all starting graph nodes in the directed graph graph data, or the data storage mode is determined respectively relative to each starting graph node in the directed graph graph data.

3. The computer-implemented method according to claim 1, wherein the node data comprises a node identifier and a node attribute, the neighbor information comprises a node identifier and a neighbor attribute, the neighbor attribute comprise basic information of all outgoing edges, and the outgoing edge data comprises an outgoing edge identifier and an outgoing edge attribute.

4. The computer-implemented method according to claim 3, wherein basic information of an outgoing edge comprises a terminal graph node identifier of the outgoing edge and an outgoing edge index feature of the outgoing edge, and the outgoing edge identifier comprises a terminal graph node identifier and an outgoing edge index feature.

5. The computer-implemented method according to claim 4, wherein the basic information of the outgoing edge further comprises at least one of a node type of a terminal graph node of the outgoing edge or an outgoing edge type of the outgoing edge, and the outgoing edge identifier further comprises an outgoing edge type.

6. The computer-implemented method according to claim 3, wherein the node data further comprises node metadata, and the node metadata comprises at least one of a node index feature or a node type.

7. The computer-implemented method according to claim 1, wherein an index feature comprises a timestamp, the outgoing edge index feature information comprises outgoing edge timestamps of all outgoing edges after being sorted in descending order, and the outgoing edge index feature range information comprises multiple outgoing edge timestamp ranges after being sorted in descending order.

8. The computer-implemented method according to claim 7, wherein each of the multiple outgoing edge timestamp ranges stores the largest outgoing edge timestamp and the smallest outgoing edge timestamp of a corresponding outgoing edge data fragment.

9. The computer-implemented method according to claim 1, wherein the first starting graph node data fragment and the second starting graph node data fragment further store reverse neighbor information, or the outgoing edge data fragment further stores an outgoing edge quantity.

10. The computer-implemented method of claim 1, wherein when the number of neighbors of each starting graph node exceeds a preset threshold, and the data storage mode is determined to be the ultra-large node data storage mode, the storing the node data, the neighbor information, outgoing edge index feature range information, and outgoing edge data fragment index of the second starting graph node in a second starting graph node data fragment in a second data storage medium comprises:
    storing the node data of the second starting graph node data fragment, neighbor index feature range, neighbor data fragment index, the outgoing edge index feature range information, and the outgoing edge data fragment index of the second starting graph node data fragment in the second data storage medium, and
    storing the neighbor information to at least two neighbor data fragments of a fourth data storage medium, respectively,
    wherein the neighbor index feature range comprises multiple neighbor index feature ranges that have a mapping relationship with the neighbor data fragment index.

11. The computer-implemented method according to claim 1, wherein the first data storage medium, the second data storage medium, and the third data storage medium respectively comprise one or more data storage media, and a portion of the first data storage medium, the second data storage medium, and the third data storage medium respectively use the same data storage medium to implement.

12. The computer-implemented method according to claim 1, wherein a non-ultra-large node data storage mode and the ultra-large node data storage mode are implemented by using a key-value pair storage mode.

13. A computer-implemented method for data query, comprising:
    in response to receiving a data query request related to directed graph graph data initiated by a user, determining a data fragment index of a target query graph node based on a node identifier of the target query graph node, wherein the directed graph graph data are stored in at least one of a first data storage medium, a second data storage medium, or a third data storage medium;
    reading a starting graph node data fragment indexed by the data fragment index from the first data storage medium or the second data storage medium into a memory of a data query device;
    parsing the starting graph node data fragment to obtain a parsed starting graph node data fragment;
    obtaining, according to the parsed starting graph node data fragment, query data of the data query request from a local parsed data of the data query device or from an outgoing edge data fragment of the third data storage medium; and
    providing the query data to the user.

14. The computer-implemented method according to claim 13, wherein the directed graph graph data comprise node data, neighbor information, and outgoing edge data of a starting graph node, the node data comprise a node identifier and a node attribute, the neighbor information comprises node identifier information and a neighbor attribute, the neighbor attribute comprises basic information of all outgoing edges, and the outgoing edge data comprise an outgoing edge identifier and an outgoing edge attribute, and
    wherein the obtaining, according to the parsed starting graph node data fragment, query data of the data query request from a local parsed data of the data query device or from an outgoing edge data fragment of the third data storage medium comprises:
    in response to the data query request indicating querying a node attribute of a graph node, obtaining a node attribute of graph node data from the parsed starting graph node data fragment as the query data;
    in response to the data query request indicating to query a neighbor attribute of a graph node, obtaining the neighbor attribute in parsed neighbor information as the query data, or
    in response to the data query request indicating querying an outgoing edge attribute of a graph node,
        determining an outgoing edge index feature of a target outgoing edge from neighbor information of the parsed starting graph node data fragment,
        determining an outgoing edge data index of the target outgoing edge based on the outgoing edge index feature and outgoing edge index feature information, and
        obtaining the outgoing edge attribute of the target outgoing edge as the query data, or
        determining an outgoing edge data fragment index of the target outgoing edge based on the outgoing edge index feature and outgoing edge index feature range information, and
        obtaining the outgoing edge attribute of the target outgoing edge as the query data from an outgoing edge data fragment in the third data storage medium that is indexed by the outgoing edge data fragment index.

15. The computer-implemented method according to claim 14, wherein the data query request comprises a filtering condition,
    wherein the in response to the data query request indicating querying a node attribute of a graph node, obtaining a node attribute of graph node data from the parsed starting graph node data fragment comprises:
    in response to the data query request indicating querying the node attribute of the graph node, query filtering the node data of the parsed starting graph node data fragment based on the filter condition in the data query request, and
    obtaining the node attribute of the node data after the query filtering, wherein the in response to the data query request indicating to query a neighbor attribute of a graph node, obtaining the neighbor attribute in parsed neighbor information comprises:
- in response to the data query request indicating to query the neighbor attribute of the graph node, query filtering the parsed neighbor information based on the filter condition in the data query request, and obtaining the neighbor attribute in neighbor information after query filtering, or wherein the in response to the data query request indicating querying an outgoing edge attribute of a graph node, determining an outgoing edge index feature of the target outgoing edge from neighbor information of the parsed starting graph node data fragment comprises:
- in response to the data query request indicating querying the outgoing edge attribute of the graph node, determining the outgoing edge index feature of the target outgoing edge meeting the filtering condition from the neighbor information of the parsed starting graph node data fragment.

16. The computer-implemented method according to claim 14, wherein the obtaining the outgoing edge attribute of the target outgoing edge as the query data from an outgoing edge data fragment in the third data storage medium that is indexed by the outgoing edge data fragment index comprises:
- reading the outgoing edge data fragment indexed by the outgoing edge data fragment index from the third data storage medium to the memory of the data query device;
- parsing storage address information of the outgoing edge data in the outgoing edge data fragment;
- determining relative storage address of target outgoing edge data in the outgoing edge data fragment according to the outgoing edge index feature of the target outgoing edge;
- acquiring and parsing the outgoing edge data of the target outgoing edge from the outgoing edge data fragment read according to the relative storage address; and
- obtaining an outgoing edge attribute of parsed outgoing edge data of the target outgoing edge as the query data.

17. The computer-implemented method according to claim 14, wherein the outgoing edge index feature comprises an outgoing edge timestamp,
- wherein the determining an outgoing edge data index of the target outgoing edge based on the outgoing edge index feature and outgoing edge index feature information comprises:
- based on the outgoing edge timestamp, performing a binary search to determine the outgoing edge data index of the target outgoing edge in outgoing edge timestamp information or determine the outgoing edge data fragment index of the target outgoing edge in outgoing edge timestamp range information, or
- wherein the determining an outgoing edge data fragment index of the target outgoing edge based on the outgoing edge index feature and the outgoing edge index feature range information comprises:
- based on the outgoing edge timestamp, performing a binary search in the outgoing edge timestamp range information to determine the outgoing edge data fragment index of the target outgoing edge.

18. The computer-implemented method according to claim 14, wherein, for each starting graph node whose neighbor number exceeds a predetermined threshold, when a data storage mode is an ultra-large node data storage mode, second starting graph node data fragment stores the node data, neighbor index feature range, neighbor data fragment index, outgoing edge index feature range information, and outgoing edge data fragment index of the starting graph node, and the neighbor information of the starting graph node is respectively stored in at least two neighbor data fragments of a fourth data storage medium,
the computer-implemented method further comprises, before the obtaining the neighbor attribute in parsed neighbor information,
- in response to the data query request indicating querying the neighbor attribute of the graph node, determining a neighbor data fragment index based on neighbor index feature and neighbor index feature range information; and
- reading the neighbor data fragment indexed by the neighbor data fragment index from the fourth data storage medium into the memory of the data query device and parsing the neighbor data fragment.

19. An apparatus, comprising:
- one or more processors; and
- one or more computer memory devices interoperably coupled with the one or more processors and having tangible, non-transitory, machine-readable media storing one or more instructions that, when executed by the one or more processors, perform one or more operations comprising:
- determining the number of neighboring graph nodes of each starting graph node in directed graph graph data to be stored;
- determining a data storage mode is an ultra-large node data storage mode or not based on the number of neighboring graph nodes of each starting graph node;
- for a first starting graph node, when the data storage mode is not the ultra-large node data storage mode,
- storing node data, neighbor information, outgoing edge index feature information, and outgoing edge data of the first starting graph node to a first starting graph node data fragment of a first data storage medium, wherein:
  - the outgoing edge index feature information comprises outgoing edge index feature information of all outgoing edges of the first starting graph node, and
  - each outgoing edge index feature has a mapping relationship with an outgoing edge data index that is used for indexing corresponding outgoing edge data stored in the first starting graph node data fragment; or
- for a second starting graph node, when the data storage mode is the ultra-large node data storage mode,
- storing node data, neighbor information, outgoing edge index feature range information, and outgoing edge data fragment index of the second starting graph node in a second starting graph node data fragment in a second data storage medium, wherein the outgoing edge index feature range information comprises multiple outgoing edge index feature ranges having a mapping relationship with the outgoing edge data fragment index, and
- storing outgoing edge data and outgoing edge data storage address information of the second starting graph node in at least two outgoing edge data fragments in a third data storage medium, wherein the outgoing edge data storage address information comprises a two-dimensional array that comprises an outgoing edge index feature of the outgoing edge data and a relative storage address of the outgoing edge data in an outgoing edge data fragment.

20. The apparatus according to claim 19, wherein the data storage mode is determined relative to all starting graph nodes in the directed graph graph data, or the data storage mode is determined respectively relative to each starting graph node in the directed graph graph data.

* * * * *